(12) United States Patent
Cormier

(10) Patent No.: US 11,003,134 B2
(45) Date of Patent: May 11, 2021

(54) SYSTEMS, DEVICES, AND METHODS FOR APERTURE-FREE HOLOGRAM RECORDING

(71) Applicant: GOOGLE LLC, Mountain View, CA (US)

(72) Inventor: John Cormier, Waterloo (CA)

(73) Assignee: Google LLC, Mountain View, CA (US)

(*) Notice: Subject to any disclaimer, the term of this patent is extended or adjusted under 35 U.S.C. 154(b) by 203 days.

(21) Appl. No.: 16/204,855

(22) Filed: Nov. 29, 2018

(65) Prior Publication Data
US 2019/0163129 A1 May 30, 2019

Related U.S. Application Data

(60) Provisional application No. 62/593,073, filed on Nov. 30, 2017.

(51) Int. Cl.
*G03H 1/00* (2006.01)
*G03H 1/02* (2006.01)
(Continued)

(52) U.S. Cl.
CPC ....... *G03H 1/0252* (2013.01); *G02B 27/0103* (2013.01); *G02B 27/0172* (2013.01);
(Continued)

(58) Field of Classification Search
CPC ............ G02B 27/0103; G02B 27/0172; G02B 2027/0105; G02B 2027/0109;
(Continued)

(56) References Cited

U.S. PATENT DOCUMENTS 3,600,054 A * 8/1971 Gabor ...................... G03H 1/12
359/25
3,677,634 A * 7/1972 Mathisen ................ H01L 21/00
355/2
(Continued)

OTHER PUBLICATIONS

Non-Final Office Action dated Jun. 15, 2020 for U.S. Appl. No. 16/204,853, 8 pages.
(Continued)

*Primary Examiner* — Arnel C Lavarias

(57) ABSTRACT

Systems, devices, and methods for aperture-free hologram recording are described. The apertures typically used for hologram recording create unwanted secondary holograms by diffracting light. Aperture-free hologram recording eliminates these unwanted secondary holograms. Aperture-free hologram recording includes applying a mask to the holographic recording medium. The mask controls the size of the recorded hologram like an aperture but does not create unwanted secondary holograms. Hologram fringes are only present in the desired recording area and a thin boundary region. The mask may be present during recording, or the mask may be used to pre-bleach the holographic recording medium. Pre-bleaching the holographic recording medium renders a portion of the holographic recording medium insensitive to light, the hologram is recorded in the light-sensitive portions of the holographic recording medium.

14 Claims, 10 Drawing Sheets

(51) Int. Cl.
  *G03H 1/26* (2006.01)
  *G02B 27/01* (2006.01)
  *G03H 1/04* (2006.01)
  *G03H 1/18* (2006.01)
(52) U.S. Cl.
  CPC ......... *G03H 1/0236* (2013.01); *G03H 1/0248* (2013.01); *G03H 1/0486* (2013.01); *G03H 1/181* (2013.01); *G03H 1/265* (2013.01); *G02B 2027/0105* (2013.01); *G02B 2027/0109* (2013.01); *G02B 2027/0174* (2013.01); *G02B 2027/0178* (2013.01); *G03H 2001/0212* (2013.01); *G03H 2001/0264* (2013.01); *G03H 2001/0415* (2013.01); *G03H 2001/266* (2013.01); *G03H 2222/12* (2013.01); *G03H 2222/13* (2013.01); *G03H 2222/16* (2013.01); *G03H 2260/12* (2013.01); *G03H 2260/34* (2013.01); *G03H 2270/21* (2013.01); *G03H 2270/55* (2013.01)

(58) Field of Classification Search
  CPC ......... G02B 2027/0174; G03H 1/0252; G03H 1/0236; G03H 1/0248; G03H 1/0486; G03H 1/181; G03H 1/265; G03H 2001/0212; G03H 2001/0264; G03H 2001/0415; G03H 2001/266; G03H 2222/12; G03H 2222/13; G03H 2222/16; G03H 2260/12; G03H 2260/34; G03H 2270/21; G03H 2270/55; G03H 1/0256; G03H 2001/0232; G03H 2001/0216; G03H 2001/043; G03H 2223/12; G03H 2223/50; G03H 2223/52; G03H 2223/53; G03H 2223/54; G03H 2223/55

USPC ............ 359/35, 1, 3, 8, 10, 11, 30; 430/1, 2
See application file for complete search history.

(56) References Cited

U.S. PATENT DOCUMENTS

| 4,017,158 | A | 4/1977 | Booth |
| 5,620,818 | A * | 4/1997 | Yuan ........................ G03F 7/20 |
| | | | 430/311 |
| 5,843,598 | A | 12/1998 | Ueda et al. |
| 6,266,167 | B1 * | 7/2001 | Klug ................... G02B 5/0252 |
| | | | 359/12 |
| 6,844,949 | B2 | 1/2005 | Kim |
| 7,133,170 | B1 | 11/2006 | Uchida et al. |
| 7,193,953 | B2 * | 3/2007 | Kim ..................... G11B 7/0065 |
| | | | 369/103 |
| 8,450,028 | B2 * | 5/2013 | Takemori ............. G03H 1/0248 |
| | | | 430/1 |
| 2019/0163126 | A1 * | 5/2019 | Cormier ............... G03H 1/0236 |
| 2019/0163127 | A1 * | 5/2019 | Cormier ............ G02B 27/0172 |
| 2019/0163128 | A1 * | 5/2019 | Cormier ................ G03H 1/181 |
| 2019/0163129 | A1 * | 5/2019 | Cormier ............... G03H 1/0486 |
| 2019/0163130 | A1 | 5/2019 | Cormier |
| 2019/0163131 | A1 * | 5/2019 | Cormier ............... G03H 1/0248 |

OTHER PUBLICATIONS

Non-Final Office Action dated Jul. 23, 2020 for U.S. Appl. No. 16/204,860, 11 pages.
Non-Final Office Action dated Jun. 17, 2020 for U.S. Appl. No. 16/204,864, 10 pages.

* cited by examiner

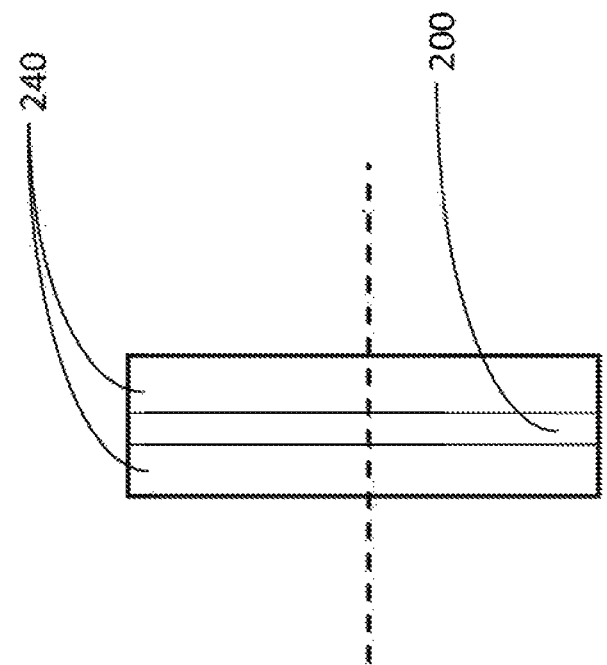
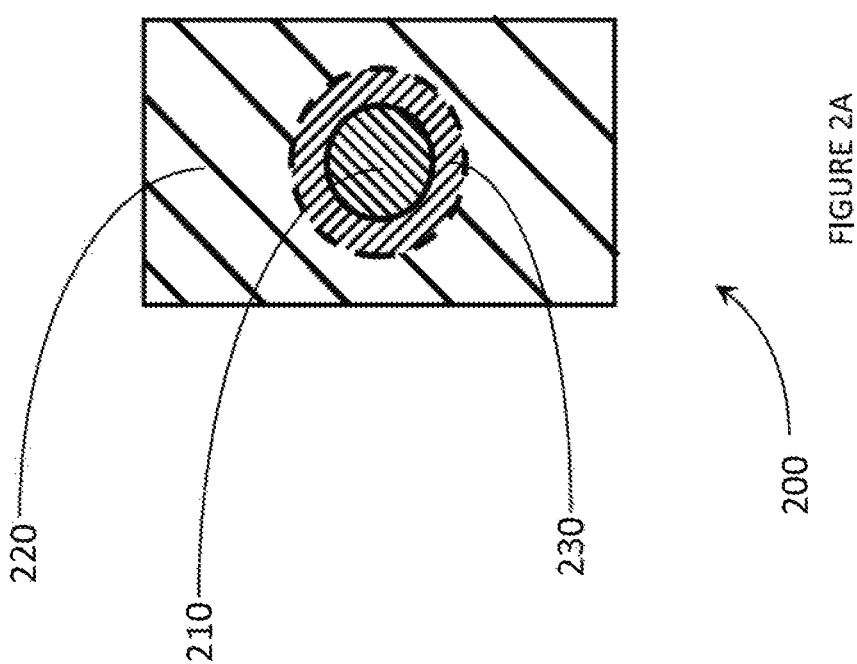

SYSTEMS, DEVICES, AND METHODS FOR APERTURE-FREE HOLOGRAM RECORDING

BACKGROUND

Technical Field

The present systems, devices, and methods generally relate to hologram recording and particularly relate to aperture-free hologram recording.

Description of the Related Art

Holograms

A hologram is a recording of a light field, with a typical light field comprising a pattern of optical fringes generated by two beams of laser light. The hologram is made up of physical fringes, where physical fringes comprise variations in the refractive index or absorbance of the holographic recording medium.

At least a portion of the light field used to record a hologram may be recreated by illuminating the hologram with laser light. If the laser light comprises the same wavelength and angle as one of the beams of laser light used to record the hologram, the holographic medium will emit laser light with the same angle and pattern as the other beam of laser light used to record the hologram. The intensity of the emitted light is determined by the efficiency of the hologram, with a higher efficiency hologram emitting more intense laser light. The efficiency of a hologram depends on both the angle and the wavelength of light used to illuminate the holographic medium. Multiple holograms may be recorded in a single holographic recording medium, the multiple holograms comprising a multiplexed hologram. A hologram may form a holographic optical element (HOE), where the hologram refracts, diffracts, attenuates or otherwise modifies the properties of the light illuminating the hologram.

Hologram Recording

A pattern of optical fringes may be generated by the interference of two beams of laser light; the two beams of laser light may be created by splitting a single beam of laser light. The two beams of laser light are typically referred to as the object beam and the reference beam. Hologram recording is typically designed such that, during playback, the recorded hologram is illuminated with laser light recreating the reference beam and the object beam is then replicated by the hologram.

Holograms are recorded in a holographic recording medium which may be a silver halide photographic emulsion, dichromated gelatin, photopolymer, or other physical media. Silver halide emulsions record a hologram as a pattern of absorbance and reflectance of light. Dichromated gelatin and photopolymer both record a hologram as a pattern of varying refractive index. Recording a hologram as a pattern of refractive index is advantageous since all of the illuminating laser light may theoretically leave the hologram; no light is necessarily absorbed by the hologram.

Apertures

A typical hologram recording assembly includes at least one aperture. An aperture is a device that is placed in the optical path of the laser light and controls the amount of light that is able to travel further along the optical path. Apertures may be used to control the overall intensity of a beam of laser light; apertures may also control the spot size of the beam of laser light. In a typical hologram recording assembly, the physical size of the recorded hologram is determined by the spot size of the object and reference beams at the holographic recording medium.

A typical aperture comprises multiple, typically five or six but possibly more, moveable blades. The blades are positioned and oriented such that they form an approximate circle with a central gap. The gap is positioned in the path of the beam of laser light such that at least a portion of the beam of laser light may pass through the gap. Laser light that impinges on the blades is blocked and cannot pass any further along the optical path. The size of the gap may be varied by moving the blades relative to one another. As the size of the gap varies, the size of the beam of laser light which may pass through the gap varies.

BRIEF SUMMARY

A holographic optical element ("HOE") comprising a single contiguous layer of photopolymer material may be summarized as including: a recorded area oriented perpendicular to the principal axis of the HOE wherein the recorded area includes hologram fringes that define at least one hologram and wherein the hologram fringes comprise a photopolymer material with a first amount of refractive index contrast; an unrecorded area oriented perpendicular to the principal axis of the HOE wherein the unrecorded area comprises photopolymer material with a uniform refractive index; and a boundary area oriented perpendicular to the principal axis of the HOE positioned between the recorded area and the unrecorded area wherein the boundary area includes hologram fringes comprising a photopolymer material with a second amount of refractive index contrast, wherein the second amount of refractive index contrast is less than the first amount of refractive index contrast, and wherein the boundary area has a thickness measured in at least one direction perpendicular to the principal axis of the HOE less than a thickness of the HOE measured parallel to the principal axis of the HOE.

The thickness of the HOE as measured parallel to the principal axis of the HOE may be selected from a group consisting of: less than one millimeter, less than one hundred micrometers, and less than six micrometers. The HOE may further include a protective layer carried by the photopolymer layer. The HOE may be curved around a center or axis of curvature located on an eye-side thereof.

The HOE may comprise N layers of photopolymer, where N is an integer greater than or equal to 1, and wherein each of the N layers of photopolymer includes: a respective one of N recorded areas, wherein each recorded area includes a respective one of N sets of hologram fringes that define a respective one of N holograms wherein each respective set of hologram fringes comprise a photopolymer material with a respective one of N first amounts of refractive index contrast; a respective one of N unrecorded areas, wherein each unrecorded area comprises a photopolymer material with a uniform refractive index; and a respective one of N boundary areas, wherein each boundary area is positioned between each respective recorded area and each respective unrecorded area, wherein each boundary area includes a respective one of N sets of secondary hologram fringes comprising a photopolymer material with a respective one of N second amounts of refractive index contrast, wherein each second amount of refractive index contrast is less than each respective first amount of refractive index contrast, and wherein the thickness of each of the N boundary areas as measured in at least one direction perpendicular to the principal axis of the HOE is less than the thickness each respective photopolymer layer as measured parallel to the principal axis of the HOE. The recorded area may include M multiplexed holograms, wherein M is an integer greater than or equal to 1.

The at least one hologram may comprise a reflection hologram. The at least one hologram may comprise at least one angle-multiplexed hologram. The at least one hologram may comprise at least one wavelength-multiplexed hologram. The at least one wavelength-multiplexed hologram may comprise a red hologram, a green hologram, and a blue hologram. The at least one wavelength-multiplexed hologram may comprise an infrared hologram. The at least one hologram may comprise a hologram with a redirection angle greater than 45 degrees. The recorded area may have a thickness measured in at least one direction perpendicular to the principal axis of the HOE less than 2 millimeters. The recorded area may comprise a holographic incoupler.

A holographic recording medium ("HRM") comprising a single contiguous layer of holographic material may be summarized as including: a recording area, wherein in the recording area a holographic material of the HRM is photopolymerizable to a first degree; a bleached area, wherein in the bleached area the holographic material of the HRM is not photopolymerizable; and a boundary area positioned between the recorded area and the unrecorded area, wherein in the boundary area the holographic material of the HRM is photopolymerizable to a second degree, wherein the first degree to which the holographic material of the HRM is photopolymerizable in the recording area is higher than the second degree to which the holographic material of the HRM is photopolymerizable in the boundary area and wherein the boundary area has a thickness as measured in at least one direction perpendicular to the principal axis of the HRM less than the thickness of the HRM as measured parallel to the principal axis of the HRM.

The thickness of the HRM as measured parallel to the principal axis of the HRM may be selected from a group consisting of: less than one millimeter, less than one hundred micrometers, and less than six micrometers. The HRM may further include a protective layer carried by the holographic material layer. The protective layer may include a first protective layer and a second protective layer, wherein the first protective layer and the second protective layer cover opposing surfaces of the photopolymer layer, and wherein at least one of the first protective layer and the second protective layer comprise a provisional protective layer. The recording area may have a thickness measured in at least one direction perpendicular to the principal axis of the HOE less than 2 millimeters.

A method of fabricating a holographic recording medium ("HRM") may be summarized as including: applying a mask to a layer of holographic material, the mask comprising: at least one obstructive area wherein the at least one obstructive area is configured to shield a portion of the layer of holographic material from light exposure; and at least one permissive area wherein the at least one permissive area is configured to expose a portion of the layer of holographic material to light; bleaching the masked layer of holographic material, wherein bleaching the masked layer of holographic material includes exposing the at least one permissive area of the mask to light; and removing the mask from the layer of holographic material.

The layer of holographic material may include a front surface and a back surface, and applying a mask to the layer of holographic material may include: applying a front mask to the front surface of the layer of holographic material, wherein the front mask comprises at least one permissive area and at least one obstructive area; and applying a back mask to the back surface of the layer of holographic material, wherein the back mask comprises a single obstructive area.

Applying a mask to a layer of holographic material may include applying a mask to a layer of holographic material wherein the mask includes at least one obstructive area with a shape selected from a group consisting of: a circle, an oval, a triangle, a square, a rectangle, a hexagon, and an octagon.

A method of recording a hologram may be summarized as including: mounting a layer of holographic material in an aperture-free hologram recording assembly; applying a mask to the layer of holographic material, the mask comprising: at least one obstructive area wherein the at least one obstructive area is configured to shield a portion of the layer of holographic material from light exposure; and at least one permissive area wherein the at least one permissive area is configured to expose a portion of the layer of holographic material to light; illuminating the layer of holographic material with laser light, wherein illuminating the layer of holographic material with laser light includes routing laser light from a laser light source along an aperture-free optical path to the layer of holographic material; removing the mask from the HRM; and bleaching the HRM.

Routing the laser light from the laser light source along an aperture-free optical path to the layer of holographic material may include: splitting the laser light with a beamsplitter to form an object beam and a reference beam; collimating the object beam; routing the object beam to illuminate the layer of holographic material; collimating the reference beam; and routing the reference beam to illuminate the layer of holographic material.

The layer of holographic material may include a front surface and a back surface, and applying a mask to the layer of holographic material may include: applying a front mask to the front surface of the layer of holographic material, wherein the front mask comprises at least one permissive area and at least one obstructive area; and applying a back mask to the back surface of the layer of holographic material, wherein the back mask comprises at least one permissive area and at least one obstructive area, and wherein the back mask is positioned and oriented such that: each permissive area of the back mask is aligned with a respective permissive area of the front mask along the principal axis of the layer of holographic material; and each obstructive area of the back mask is aligned with a respective obstructive area of the front mask along the principal axis of the layer of holographic material.

Applying a front mask to the front surface of the layer of holographic material may include applying a front mask to the front surface of the layer of holographic material wherein the front mask comprises at least one permissive area with a shape selected from a group consisting of: a circle, an oval, a triangle, a square, a rectangle, a hexagon, and an octagon; and applying a back mask to the back surface of the layer of holographic material may include applying a back mask to the back surface of the layer of holographic material wherein the back mask comprises at least one permissive area with a shape chosen from a group consisting of: a circle, an oval, a triangle, a square, a rectangle, a hexagon, and an octagon.

The method may further include: pre-bleaching the layer of holographic material subsequent to applying a mask to the layer of holographic material, wherein applying a mask to the layer of holographic material includes applying a negative mask to the layer of holographic material. Illuminating the layer of holographic material with laser light may include illuminating the layer of holographic material with laser light that comprises N different wavelengths of laser light, where N is an integer greater than 1. Illuminating the layer of holographic material with laser light may include concurrently illuminating a same surface of the layer of holographic material with both a laser light reference beam and a laser light object beam.

Illuminating the layer of holographic material with laser light may include concurrently illuminating a first surface of the layer of holographic material with a laser light reference beam and a second surface of the layer of holographic material with a laser light object beam, wherein the second surface of the layer of holographic material is located opposite the first surface of the layer of holographic material. Illuminating the layer of holographic material with laser light may include illuminating the layer of holographic material with at least one laser light reference beam and at least two laser light object beams. Illuminating the layer of holographic material with laser light may include illuminating the layer of holographic material with laser light generated by a laser light source wherein the laser light source comprises an aperture. Illuminating the layer of holographic material with laser light may include illuminating the layer of holographic material with laser light that comprises N different angles, where N is an integer greater than 1.

A method of recording a hologram may be summarized as including: mounting a layer of holographic material in an aperture-free hologram recording assembly; applying a mask to the layer of holographic material, the mask comprising: at least one obstructive area wherein the at least one obstructive area is configured to shield a portion of the layer of holographic material from light exposure; and at least one permissive area wherein the at least one permissive area is configured to expose a portion of the layer of holographic material to light; generating a laser light signal with at least one laser light source; splitting the laser light signal with a beamsplitter to form an object beam and a reference beam; routing the object beam to illuminate the layer of holographic material; shaping the object beam to a desired cross-section at the layer of holographic material; routing the reference beam to illuminate the layer of holographic material; shaping the reference beam to a desired cross-section at the layer of holographic material; generating a pattern of optical fringes in at least a portion of the layer of holographic material by a combination of the reference beam and the object beam; recording the pattern of optical fringes as a pattern of physical fringes in at least a portion of the layer of holographic material; removing the mask from the layer of holographic material; and bleaching the layer of holographic material.

The layer of holographic material may include a front surface and a back surface, and applying a mask to the layer of holographic material may include: applying a front mask to the front surface of the layer of holographic material, wherein the front mask comprises at least one permissive area and at least one obstructive area; and applying a back mask to the back surface of the layer of holographic material, wherein the back mask comprises at least one permissive area and at least one obstructive area, and wherein the back mask is positioned and oriented such that: each permissive area of the back mask is aligned with a respective permissive area of the front mask along the principal axis of the layer of holographic material; and each obstructive area of the back mask is aligned with a respective obstructive area of the front mask along the principal axis of the layer of holographic material.

Applying a front mask to the front surface of the layer of holographic material may include applying a front mask to the front surface of the layer of holographic material wherein the front mask comprises at least one permissive area with a shape selected from a group consisting of: a circle, an oval, a triangle, a square, a rectangle, a hexagon, and an octagon; and applying a back mask to the back surface of the layer of holographic material may include applying a back mask to the back surface of the layer of holographic material wherein the back mask comprises at least one permissive area with a shape chosen from a group consisting of: a circle, an oval, a triangle, a square, a rectangle, a hexagon, and an octagon. The method may further include: pre-bleaching the layer of holographic material subsequent to applying a mask to the layer of holographic material, wherein applying a mask to the layer of holographic material includes applying a negative mask to the layer of holographic material.

Generating a laser light signal may include generating a laser light signal comprising N wavelengths of laser light, where N is an integer greater than 1, and generating a pattern of optical fringes in at least a portion of the layer of holographic material by a combination of the reference beam and the object beam may include generating N sub-patterns of optical fringes in at least a portion of the layer of holographic material by the combination of the reference beam and the object beam; and recording the pattern of optical fringes as a pattern of physical fringes in at least a portion of the layer of holographic material may include recording the N sub-patterns of optical fringes as N sub-patterns of physical fringes in at least a portion of the layer of holographic material.

Routing the object beam to illuminate the layer of holographic material may include routing the object beam to illuminate a first surface of the layer of holographic material, and routing the reference beam to illuminate the layer of holographic material may include routing the reference beam to illuminate the first surface of the layer of holographic material. Routing the object beam to illuminate the layer of holographic material may include routing the object beam to illuminate a first surface of the layer of holographic material, and routing the reference beam to illuminate the layer of holographic material may include routing the reference beam to illuminate a second surface of the layer of holographic material, wherein the first surface of the layer of holographic material and the second surface of the layer of holographic material are opposite surfaces of the layer of holographic material.

Generating a laser light signal may include generating a laser light signal with a laser light source wherein the laser light source comprises an aperture. Generating a laser light signal may include generating a laser light signal comprising M angles, where M is an integer greater than 1, and wherein generating a pattern of optical fringes in at least a portion of the layer of holographic material by a combination of the reference beam and the object beam may include generating M sub-patterns of optical fringes in at least a portion of the layer of holographic material by the combination of the reference beam and the object beam; and recording the pattern of optical fringes as a pattern of physical fringes in at least a portion of the layer of holographic material may include recording the M sub-patterns of optical fringes as N sub-patterns of physical fringes in at least a portion of the layer of holographic material.

A method of recording a hologram may be summarized as including: mounting a layer of holographic material in an aperture-free hologram recording assembly; applying a mask to a layer of holographic material, the mask comprising: at least one obstructive area wherein the at least one obstructive area is configured to shield a portion of the layer of holographic material from light exposure; and at least one permissive area wherein the at least one permissive area is configured to expose a portion of the layer of holographic material to light; generating a laser light signal with at least one laser light source; splitting the laser light signal with at least one beamsplitter to form N object beams and M reference beams, where N and M are both integers that are greater than or equal to 1; routing the N object beams to illuminate the layer of holographic material; shaping the N object beams to N respective cross-sections at the layer of holographic material; routing the M reference beams to illuminate the layer of holographic material; and shaping the M reference beams to M respective cross-sections at the layer of holographic material; generating a pattern of optical fringes in at least a portion of the layer of holographic material by a combination of the M reference beams and the N object beams; recording the pattern of optical fringes as a pattern of physical fringes in at least a portion of the layer of holographic material; removing the mask from the layer of holographic material; and bleaching the layer of holographic material.

The method may further include: pre-bleaching the layer of holographic material subsequent to applying a mask to the layer of holographic material, wherein applying a mask to the layer of holographic material includes applying a negative mask to the layer of holographic material.

The layer of holographic material may comprise a front surface and a back surface, and applying a mask to the layer of holographic material may include: applying a front mask to the front surface of the layer of holographic material, wherein the front mask comprises at least one permissive area and at least one obstructive area; and applying a back mask to the back surface of the layer of holographic material, wherein the back mask comprises at least one permissive area and at least one obstructive area, and wherein the back mask is positioned and oriented such that: each permissive area of the back mask is aligned with a respective permissive area of the front mask along the principal axis of the layer of holographic material; and each obstructive area of the back mask is aligned with a respective obstructive area of the front mask along the principal axis of the layer of holographic material.

Applying a front mask to the front surface of the layer of holographic material may include applying a front mask to the front surface of the layer of holographic material wherein the front mask comprises at least one permissive area with a shape selected from a group consisting of: a circle, an oval, a triangle, a square, a rectangle, a hexagon, and an octagon; and applying a back mask to the back surface of the layer of holographic material may include applying a back mask to the back surface of the layer of holographic material wherein the back mask comprises at least one permissive area with a shape chosen from a group consisting of: a circle, an oval, a triangle, a square, a rectangle, a hexagon, and an octagon.

Splitting the laser light signal with at least one beamsplitter to form N object beams and M reference beams may include splitting the laser light signal to form N object beams wherein each of the N object beams possesses a different angle than each of the other N object beams. Splitting the laser light signal with at least one beamsplitter to form N object beams and M reference beams may include splitting the laser light signal to form M reference beams wherein each of the M reference beams possesses a different angle than each of the other M reference beams.

Generating a laser light signal may include generating a laser light signal comprising L wavelengths of laser light, where L is an integer greater than 1, and wherein generating a pattern of optical fringes in at least a portion of the layer of holographic material by a combination of the M reference beams and the N object beams may include generating L sub-patterns of optical fringes in at least a portion of the layer of holographic material for each of the combinations of the M reference beams and the N object beams; and recording the pattern of optical fringes as a pattern of physical fringes in at least a portion of the layer of holographic material may include recording the L sub-patterns of optical fringes as L sub-patterns of physical fringes in at least a portion of the layer of holographic material.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

FIG. 2A is a cross-sectional view of HOE 200 in accordance with the present systems, devices, and methods.

FIG. 2B is a side elevational view of HOE 200 in accordance with the present systems, devices, and methods.

DETAILED DESCRIPTION

Figure 1:
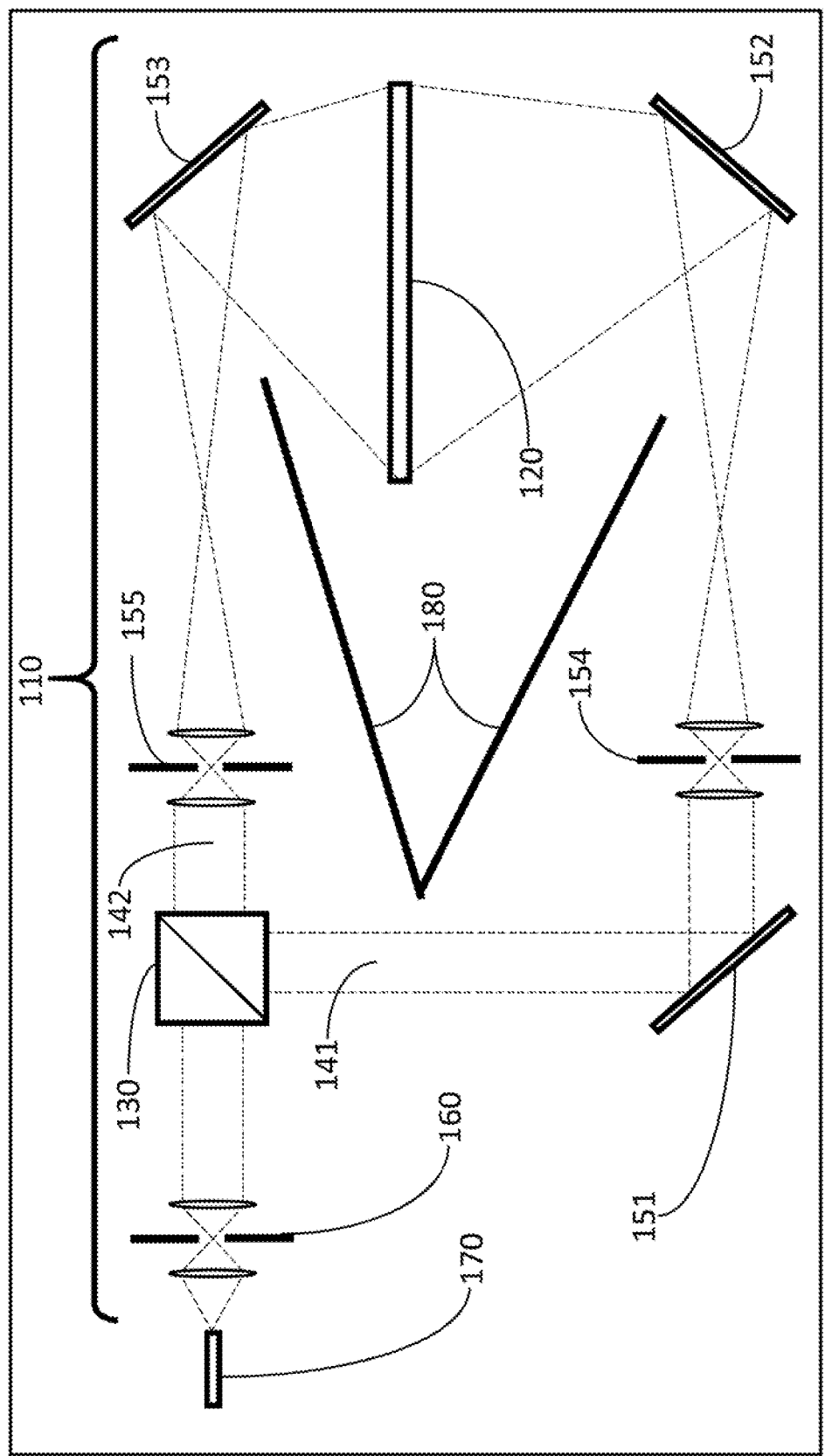
FIG. 1 is a top-elevational view of typical hologram recording assembly 100.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, devices, and methods for aperture-free hologram recording and are particularly well-suited for use in holographic displays, particularly holographic displays used in wearable heads-up displays.

A typical hologram recording assembly records multiple unintended holograms within and outside the desired hologram recording area in addition to recording the intended hologram. The use of apertures in the hologram recording assembly creates unintended holograms because apertures diffract and reflect light and the diffracted and/or reflected light creates additional patterns of optical fringes. Eliminating apertures from the hologram recording assembly eliminates the recording of at least some of the unintended holograms, however apertures perform important functions during hologram recording and therefore novel systems, devices, and methods are required to record holograms in an aperture-free hologram recording assembly.

A hologram may comprise a holographic optical element HOE. In some implementations, the HOE may be carried on or by another structure. For instance, one or more HOEs may be carried on or by a waveguide or lightguide structure and may serve as, for example, an in-coupler, out-coupler, or exit pupil expander for such waveguide or lightguide structure. Thus, for the purposes of the present systems, device, and methods, including the appended claims, the term "HOE" includes a diffractive material combined with waveguide/lightguide structures. Likewise, when the term "HOE" is used, the HOE may be carried on or by other structures or layers, or may itself carry other structures or layers, depending on the specific implementation.

When a hologram is illuminated with light with a wavelength and angle matching the reference beam used to record the hologram, the hologram diffracts the reference beam to create light with a wavelength and angle matching the object beam used to record the hologram (i.e. the hologram plays back the reference beam to form the object beam). The hologram may direct the object beam in one of two directions. If the light played back travels in the opposite direction of the reference beam (in other words, the playback light appears to be reflected by the hologram), the hologram is referred to as a reflection hologram. A reflection hologram may be recorded with an object beam and a reference beam positioned on the same side of a holographic recording medium. If the light played back travels in the same direction as the reference beam (in other words, the playback light appears to have been transmitted through the hologram), the hologram is referred to as a transmission hologram. A transmission hologram may be recorded with an object beam and a reference beam positioned on opposite sides of a holographic recording medium.

The object beam played back by the hologram may have a different angle than the reference beam, the difference in angle between the object beam and the reference beam played back by the hologram is the redirection angle.

FIG. 1 is a top-elevational view of typical hologram recording assembly 100. Typical hologram recording assembly 100 comprises aperture-containing optical path 110, holographic recording medium ("HRM") 120, beamsplitter 130, object beam 141, reference beam 142, object beam mirror 151, object beam mirror 152, reference beam mirror 153, object beam aperture assembly 154, reference beam aperture assembly 155, collimating aperture assembly 160, laser light source 170 and baffle 180. Each of object beam aperture assembly 154, reference beam aperture assembly 155, and collimating aperture assembly 160 comprise a respective aperture, focusing lens, and collimating lens.

Recording a hologram requires the generation of a pattern of optical fringes with laser light; the pattern of optical fringes is then recorded as a pattern of physical fringes in a HRM. The laser light may be generated by a laser light source; the laser light may then be manipulated to generate a pattern of optical fringes. Non-exclusive examples of laser light manipulations include focusing the laser light with a lens, reflecting the laser light with a mirror, and blocking a portion of the laser light with an aperture. Laser light source 170 generates a laser light signal. Beamsplitter 130 splits the laser light signal into object beam 141 and reference beam 142. Object beam mirror 151 and object beam mirror 152 route object beam 141 to HRM 120. Reference beam mirror 153 routes reference beam 142 to HRM 120. The combination of object beam 141 and reference beam 142 at HRM 120 creates a pattern of optical fringes, the pattern of optical fringes is recorded as a pattern of physical fringes in HRM 120.

The pattern of optical fringes is recorded as a pattern of physical fringes via a reaction between the HRM and the laser light comprising the pattern of optical fringes. The reaction between the HRM and the laser light may be physical; non-exclusive examples of physical reactions include melting, ablation, and light-induced changes in refractive index. The reaction between the HRM and may be chemical, a non-exclusive example of a chemical reaction is photopolymerization.

In a photopolymerization, a photoinitiator absorbs light and produces active centers. Non-exclusive examples of active centers include anions, cations, and free radicals. The active centers convert a monomer to a polymer until all of the available monomer has reacted or until the active centers are destroyed by at least one quenching reaction. A photopolymerizable HRM comprises a photoinitiator, a monomer, and a matrix polymer. The monomer may be converted to photopolymer by exposing the HRM to light. The matrix polymer has a first refractive index and the photopolymer has a second refractive index; the first refractive index may be higher than the second refractive index and the first refractive index may be lower than the second refractive index. The pattern of optical fringes is recorded in the photopolymerizable HRM as a pattern of photopolymer, where the pattern of photopolymer comprises a pattern of higher or lower refractive index.

A typical HRM is larger than the desired hologram to allow variation in the size and position of the recorded hologram. The position of the pattern of optical fringes determines the position of the hologram and the position of the pattern of optical fringes may be controlled by routing the laser light with mirrors. The spot size of the laser light at the HRM typically determines the size of the recorded hologram and the spot size of the laser light may be controlled by blocking a portion of the laser light with an aperture. Object beam aperture assembly 154, reference beam aperture assembly 155, and collimating aperture assembly 160 each comprise an aperture that blocks a portion of the laser light to control the size of the hologram recorded in HRM 120.

Blocking a portion of the laser light with an aperture is disadvantageous since the laser light will diffract as it passes the sharp edge of the moveable blade of the aperture. Diffracting the laser light may produce an Airy disk around the beam of laser light, where an Airy disk comprises a series of rings of laser light surrounding the primary beam of laser light. The distance between the primary beam of laser light and the rings of the Airy disk is determined by the distance over which the diffracting laser light can propagate. No observable Airy disk is formed immediately adjacent to the aperture, however the Airy disk becomes visible, and the distance between the primary beam of laser light and the rings of the Airy disk increases, as the distance between the aperture and HRM 120 increases.

Multiple apertures along aperture-containing optical path 110 cause successive diffractions of the laser light, resulting in complex patterns of optical fringes within and outside the intended hologram recording area in HRM 120 in addition to the intended pattern of optical fringes created by the combination of object beam 141 and reference beam 142.

Apertures are typically constructed of light-absorbing materials to reduce the amount of stray light generated by blocking a portion of the laser light signal. The light absorbing-materials used in aperture construction are not perfectly efficient, therefore blocking a portion of laser light with an aperture will generate some stray light. Stray light can reach the HRM and create an unintended pattern of optical fringes that may be recorded as an unintended pattern of physical fringes in HRM 120. Baffle 180 is typically included in conventional hologram recording assembly 100 in an attempt to prevent stray light from reaching HRM 120. Baffle 180 is typically constructed of light-absorbing materials that are not perfectly efficient and may reflect stray light, therefore the inclusion of baffle 180 in typical hologram recording assembly 100 does not necessarily reduce the amount of stray light that reaches HRM 120 and may in fact increase the amount of stray light reaching HRM 120.

A person of skill in the art would appreciate that, in the various embodiments described herein, photopolymer is used as an exemplary holographic material. Unless the specific context requires otherwise, the present systems, devices, and methods can be employed with holographic materials other than photopolymer e.g. photographic emulsion, dichromated gelatin, photothermoplastics, and photorefractives, and references to photopolymer should generally be construed to encompass any holographic material.

FIG. 2A is a cross-sectional view of holographic optical element ("HOE") 200 in accordance with the present systems, devices, and methods. HOE 200 comprises a single contiguous layer of photopolymer material. HOE 200 includes recorded area 210, unrecorded area 220, and boundary area 230. Throughout this specification and the appended claims, the term "layer" generally refers to a thickness of some material that provides and/or is spread over a surface, such as a stratum or a coating on a surface. A layer may include or cover a single side or face of a structure, such as a dielectric layer in a printed circuit board or a layer of cheese on a pizza, or a layer may include or cover multiple sides or faces of a three-dimensional structure, such as a layer of clothing or a layer of planet Earth (e.g., the crust, mantle, etc.). A person of skill in the art will appreciate that the material of one layer may form the substrate of another layer.

Recorded area 210 includes hologram fringes that define at least one hologram. Recorded area 210 is oriented perpendicular to the principal axis of HOE 200. Throughout this specification and the appended claims, the term "principal axis" generally refers to the line parallel to the smallest dimension of a holographic optical element or a holographic recording medium. An exemplary HOE has a thickness in a first dimension less than two millimeters, and a thickness in a second dimension and a thickness in a third dimension greater than one centimeter. The principle axis of the exemplary HOE would therefore be parallel to the first dimension and perpendicular to the second and third dimensions.

The hologram fringes of recorded area 210 comprise a photopolymer material with a first amount of refractive index contrast. The first amount of refractive index contrast may be greater than 0.005, greater than 0.016, or greater than 0.06. A refractive index contrast greater than 0.005 is advantageous since holograms with a refractive index contrast below 0.005 typically do not possess sufficiently high diffraction efficiencies for photopolymer of a typical thickness. A refractive index contrast greater than 0.016 and/or greater than 0.06 may be advantageous as a higher refractive index contrast typically causes a hologram to have a higher efficiency, however a person of skill in the art will appreciate that an excessively high refractive index contrast may cause the hologram to be overmodulated, reducing the efficiency of the hologram. Unrecorded area 220 comprises photopolymer material with a uniform refractive index. Photopolymer material with a uniform refractive index contains no hologram fringes. The absence of hologram fringes in unrecorded area 200 includes the absence of hologram fringes from unwanted secondary holograms. Unrecorded area 220 is oriented perpendicular to the principal axis of HOE 200.

Boundary area 230 includes hologram fringes comprising a photopolymer material with a second amount of refractive index contrast wherein the second amount of refractive index contrast is less than the first amount of refractive index contrast. The hologram fringes of boundary area 230 comprise a hologram with a lower diffraction efficiency than the hologram located in recorded area 210 due to the lower refractive index contrast of the hologram fringes of boundary area 230.

Boundary area 230 is oriented perpendicular to the principal axis of HOE 200. Boundary area 230 has a thickness as measured in at least one direction perpendicular to the principal axis of HOE 200 less than a thickness of HOE 200 measured parallel to the principal axis of HOE 200. The thickness of boundary area 230 as measured perpendicular to the principal axis of HOE 200 may be less than one millimeter, less than one hundred micrometers, or less than six micrometers. Boundary area 230 is positioned between recorded area 210 and unrecorded area 220. The limited thickness and reduced diffraction efficiency of boundary area 230 may be created by recording HOE 200 in an aperture-free hologram recording assembly.

The at least one hologram defined by the hologram fringes in recorded area 210 may comprise a wavelength-multiplexed hologram. A wavelength multiplexed hologram comprises at least two wavelength-specific holograms, wherein each wavelength-specific hologram has a respective playback wavelength; each wavelength-specific hologram may have a respective incident playback angle and a respective redirection angle. A wavelength multiplexed hologram may include a red hologram, a green hologram, and a blue hologram, which advantageously allows the hologram to be used in a full-color display (as a holographic combiner or as a holographic incoupler/outcoupler). A wavelength multiplexed hologram may include an infrared hologram, which advantageously may be employed in eye tracking applications.

The at least one hologram defined by the hologram fringes in recorded area 210 may possess a redirection angle greater than 30 degrees, greater than 45 degrees, or greater than 60 degrees. A high redirection angle is advantageous for HOEs employed as incouplers and/or outcouplers in light guides, since a higher redirection angle increases the resolution of light guide based displays.

Recorded area 210 may possess a thickness measured in at least one direction perpendicular to the principal axis of HOE 200 less than 2 millimeters; a HOE with a smaller thickness in at least one direction perpendicular to the principal axis of the HOE is advantageous for use as a holographic incoupler for a light guide based display, as a smaller incoupler increases the resolution of said display.

FIG. 2B is a side elevational view of HOE 200 in accordance with the present systems, devices, and methods. HOE 200 may comprise a protective layer 240 carried by the single contiguous layer of photopolymer of HOE 200. Non-exclusive examples of protective layer materials include acrylic, polystyrene, and polycarbonate. Protective layer 240 is physically coupled to HOE 200. The protection provided by protective layer 240 includes protection from scratches, tears, and water damage.

HOE 200 may be curved around a center or axis of curvature located on an eye-side of HOE 200. A curved HOE may be a spherically curved HOE; a spherically curved HOE is curved around a center of curvature. A curved HOE may be a cylindrically curved HOE; a cylindrically curved HOE is curved around an axis of curvature. The center or axis of curvature, as appropriate, of HOE 200 may be located on the eye-side of HOE 200 at a distance of between 1 and 10 centimeters, between 10 and 50 cm, or between 50 and 100 cm from HOE 200.

Throughout this specification and the appended claims, the term "eye-side" refers to the side of the object that, when employed in a device worn by a user, faces towards the eye of the user, while the term "world-side" refers to the side of the eyeglass lens that, when employed in a device worn by a user, faces away from the eye of the user and towards the outside world.

A curved HOE may be more easily incorporated into curved lenses for use as a transparent combiner in a wearable heads-up display ("WHUD"); curved lenses have greater aesthetic appeal than planar lenses. Recorded area 210 may include M multiplexed holograms, where M is an integer greater or equal to 1. The M multiplexed holograms may be wavelength-multiplexed holograms, angle multiplexed holograms, or any combination thereof.

Recorded area 210, unrecorded area 220, and boundary area 230 comprise a single layer of photopolymer. HOE 200 may comprise N layers of photopolymer, where N is an integer greater than or equal to 1. Each of the N layers of photopolymer include a respective one of N recorded areas 210, a respective one of N unrecorded areas 220, and a respective one of N boundary areas 230.

Each of the N recorded areas 210 includes a respective one of N sets of hologram fringes that define at least one hologram. Each set of hologram fringes comprise a photopolymer material with a respective one of N first amounts of refractive index contrast. Each of the N unrecorded areas 220 comprises a photopolymer with a uniform refractive index.

Each of the N boundary areas 230 is positioned between each respective recorded area and each respective unrecorded area. Each boundary area 230 includes a respective one of N sets of secondary hologram fringes; each set of secondary hologram fringes comprises a photopolymer material with a respective one of N second amounts of refractive index contrast. Each of the N second amounts of refractive index contrast is less than each respective first amount of refractive index contrast. The thickness of each of the N boundary areas, as measured in at least one direction perpendicular to the principal axis of the HOE, is less than the thickness of each one of the N boundary areas as measured parallel to the principal axis of the HOE.

Figure 3A:
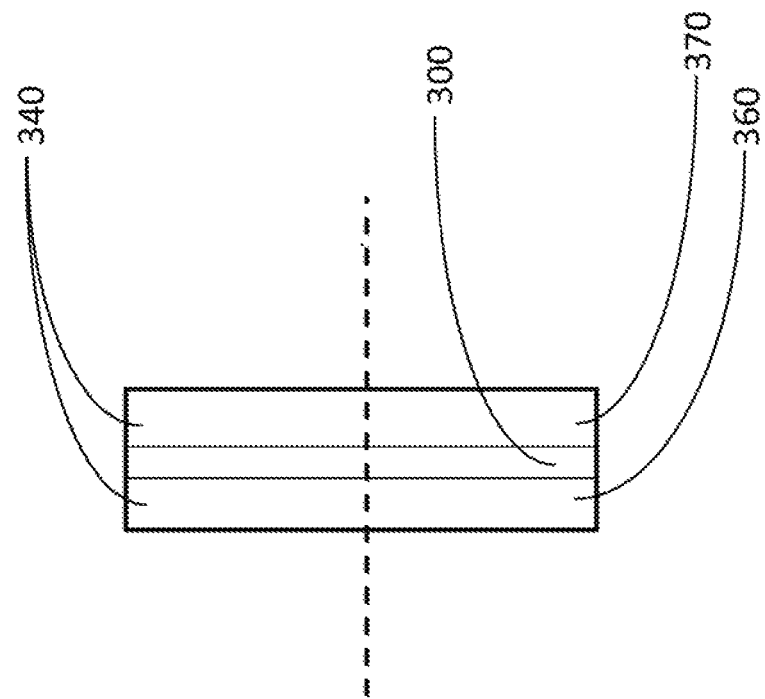
FIG. 3A is a cross-sectional view of HRM 300 in accordance with the present systems, devices, and methods.

FIG. 3A is a cross-sectional view of holographic recording medium ("HRM") 300 in accordance with the present systems, devices, and methods. HRM 300 comprises a single contiguous layer of holographic material. HRM 300 comprises recording area 310, bleached area 320 and boundary area 330. In recording area 310 a holographic material of HRM 300 is photopolymerizable to a first degree. In bleached area 320 the holographic material of HRM 300 is not photopolymerizable.

The degree to which a holographic material is photopolymerizable is determined by the amount of photoinitiator and the amount of monomer present in the holographic material. A holographic material is photopolymerizable if the holographic material contains both photoinitiator and monomer. A holographic material is not photopolymerizable if the holographic material lacks sufficient quantities of either photoinitiator or monomer to produce photopolymer upon exposure to light. A holographic material with a greater amount of photoinitiator and a greater amount of monomer is more photopolymerizable than a holographic material with a lesser amount of photoinitiator and a lesser amount of monomer. Exposing a holographic material to light causes the holographic material to become less photopolymerizable by consuming both photoinitiator and monomer.

Boundary area 330 is positioned between recorded area 310 and bleached area 320. In boundary area 320 the holographic material of HRM 300 is photopolymerizable to a second degree. The first degree to which the holographic material of HRM 300 is photopolymerizable in recording area 310 is higher than the second degree to which the holographic material of HRM 300 is polymerizable in boundary area 330. Boundary area 330 has a thickness as measured in at least one direction perpendicular to the principal axis of HRM 300 less than a thickness of HRM 300 measured parallel to the principal axis of HRM 300. The thickness of boundary area 330 as measured perpendicular to the principal axis of HRM 300 may be less than one millimeter, less than one hundred micrometers, less than six micrometers.

A hologram may be recorded in HRM 300. The size of the hologram recorded in HRM 300 may not exceed the area of recording area 310 and boundary area 300 combined; the size of the hologram will not significantly exceed the area of recording area 310 due to the limited dimensions of boundary area 330 as described above. The size limits imposed on hologram recording by the size of recording area 310 are advantageous, since this allows the size of the hologram to be determined by the physical dimensions of recording area 310 rather than the spot sizes of beams of laser light used to record holograms. The spot size of a beam of laser light is typically controlled by an aperture. Eliminating the need to control spot sizes when recording a hologram in HRM 300 therefore eliminates the need for apertures when recording a hologram in HRM 300.

Recording area 310 may possess a thickness measured in at least one direction perpendicular to the principal axis of HRM 300 less than 2 millimeters; a recording area with a smaller thickness in at least one direction perpendicular to the principal axis of the HOE is advantageous for use as a recording material for holographic incouplers for a light guide based display, as a smaller incoupler increases the resolution of said display.

Figure 3B:
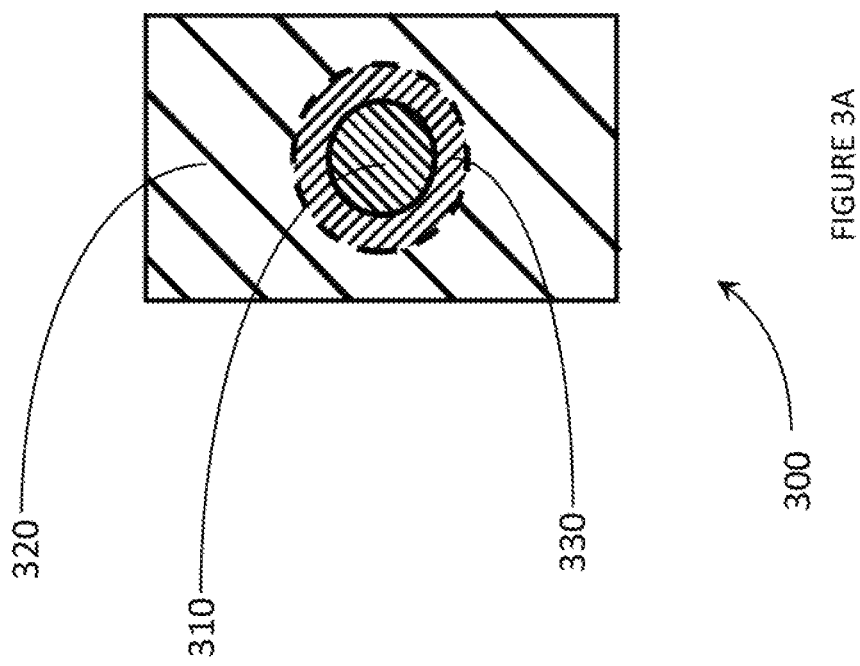
FIG. 3B is a side elevational view of HRM 300 in accordance with the present systems, devices, and methods.

FIG. 3B is a side elevational view of HRM 300 in accordance with the present systems, devices, and methods. HRM 300 may comprise a protective layer 340 carried by the single contiguous layer of holographic material of HRM 300. Protective layer 340 may comprise first protective layer 360 and second protective layer 370. First protective layer 360 and second protective layer 370 cover opposing surfaces of the single contiguous layer of holographic material of HRM 300. At least one of first protective layer 360 and second protective layer 370 may comprise a provisional protective layer. A provisional protective layer may be physically de-coupled from HRM 300 without causing damage to HRM 300. A provisional protective layer is advantageous as it protects HRM 300 from damage during processing and may then be removed prior to any subsequent processes that are incompatible with the protective layer.

Figure 4:
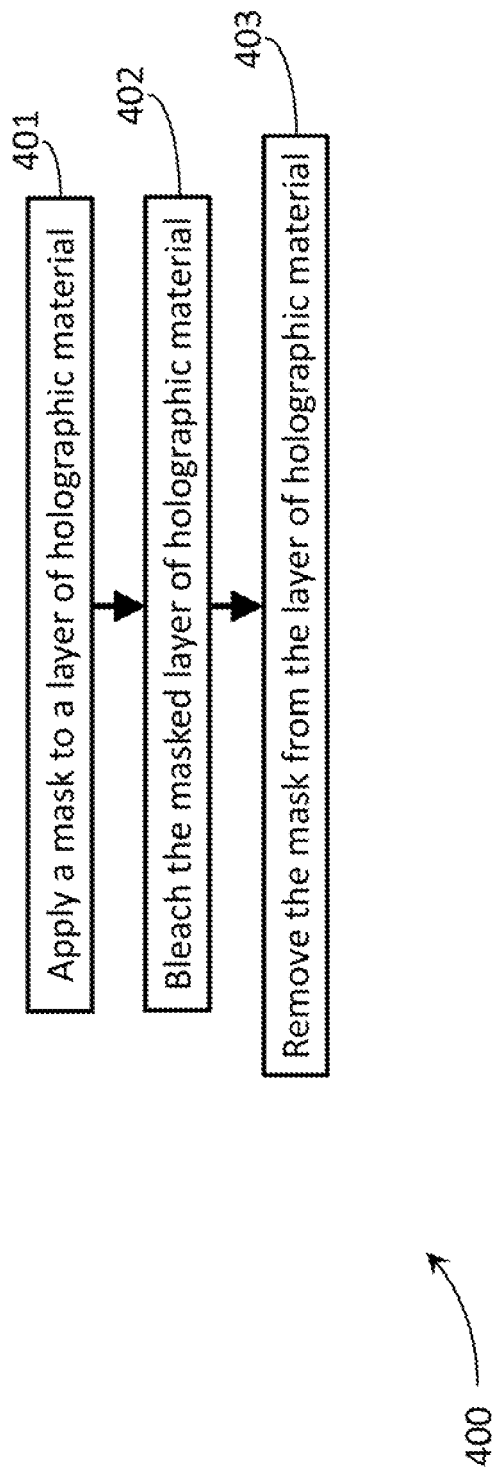
FIG. 4 is a flow-diagram showing a method 400 of fabricating a HRM in accordance with the present systems, devices, and methods.

FIG. 4 is a flow-diagram showing a method 400 of fabricating a HRM in accordance with the present systems, devices, and methods. Method 400 includes three acts 401, 402, and 403 though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments.

Figure 5:
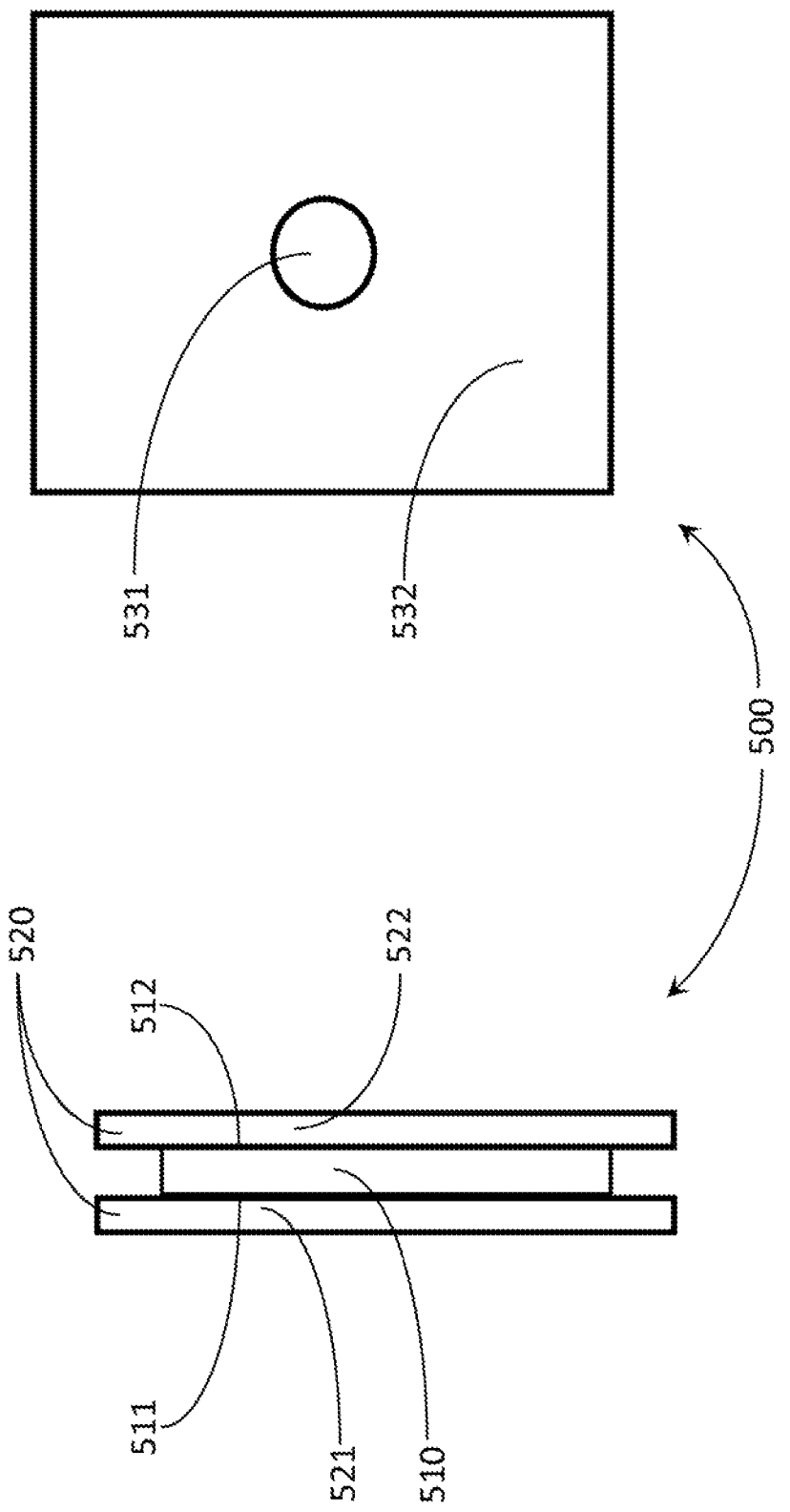
FIG. 5A is a side elevational view of masked layer of holographic material 500 in accordance with the present systems, devices, and methods.
FIG. 5B is a front elevational view of masked layer of holographic material 500 in accordance with the present systems, devices, and methods.

As an illustrative example of the physical elements of method 400, analogous structures from FIG. 5 are called out in parentheses throughout the description of acts 401, 402, and 403.

At 401, a mask (520) is applied to a layer of holographic material (510). The mask (520) is a layer of material that is provisionally physically coupled to the layer of holographic material (510); the mask (520) may be applied to the layer of holographic material (510) and the mask (520) may also be removed from the layer of holographic material (510). The mask (520) comprises at least one permissive area (531) and at least one obstructive area (532). The at least one permissive area (531) allows a subsequent treatment to occur in the area of the layer of holographic material covered by the at least one permissive area (531). The at least one obstructive area (532) prevents a subsequent treatment from occurring in the area of the layer of holographic material covered by the at least one obstructive area (532). Non-exclusive examples of treatments include bleaching, etching, and hardening.

Permissive areas (531) may be non-contiguous. Permissive areas (531) may have shapes and features with an upper size limit determined by the size of the mask (520) since a given feature must be able to fit entirely within the mask (520). Permissive areas (531) may have shapes and features with a lower size limit determined by the resolution limit of the mask fabrication method. Masks may be produced via photolithographic techniques which can produce features with a resolution limit of 50 nanometers. Obstructive areas (532) may be non-contiguous. Obstructive areas (532) may have shapes and features with an upper size limit determined by the size of the mask (520) and a lower size limit determined by the resolution limit of the mask fabrication method. The obstructive area (532) may have a shape selected from a group consisting of: a circle, an oval, a triangle, a square, a rectangle, a hexagon, and an octagon.

The layer of holographic material (510) may comprise a front surface (511) and a back surface (512). Applying a mask (520) to a layer of holographic material (510) may include applying a front mask (521) to the front surface of the layer of holographic material (511). The front mask (521) comprises at least one permissive area (531) and at least one obstructive area (532). Applying a mask (520) to a layer of holographic material (510) may include applying a back mask (522) to the back surface of the layer of holographic material (512). The back mask (522) comprises a single obstructive area.

At 402, the masked layer of holographic material (500) is bleached. Bleaching includes exposing the masked layer of holographic material (500) to a bleaching agent. Non-exclusive examples of a bleaching agents include acids, peroxides, hypochlorites, and light. Photobleaching includes exposing a masked layer of holographic material (500) to light. The light used for photobleaching may be incoherent. The light used for photobleaching may be polychromatic, wherein at least a portion of the light which is used for photobleaching may be absorbed by the photoinitiator or the monomer.

Photobleaching the masked layer of holographic material (500) converts at least a portion of the layer of holographic material (510) from a photopolymerizable material to a material that is not photopolymerizable. During photobleaching, the permissive areas (531) of the mask (520) are transparent to at least one wavelength of the light used for photobleaching. During photobleaching, the obstructive areas (532) of the mask (520) are opaque to all wavelengths of the light used for photobleaching that may be absorbed by the photoinitiator or the monomer.

At 403, the mask is removed from the layer of holographic material (510).

FIG. 5A is a side elevational view of masked layer of holographic material 500 in accordance with the present systems, devices, and methods. Masked layer of holographic material 500 includes layer of holographic material 510 and mask 520. Layer of holographic material 510 includes front surface of the layer of holographic material 511 and back surface of the layer of holographic material 512. Mask 520 comprises front mask 521 and back mask 522.

FIG. 5B is a front elevational view of masked layer of holographic material 500 in accordance with the present systems, devices, and methods. Only front mask 521 is visible in FIG. 5B due to the front elevational view; layer of holographic material 510 and back mask 522 are obscured from view by front mask 521 due to the viewing angle in FIG. 5B. Front mask 521 comprises at least one permissive area 531 and at least one obstructive area 532. Back mask may be substantively similar to front mask 531. Back mask 522 comprises at least one obstructive area 532 and may comprise at least one permissive area 531.

Figure 6:
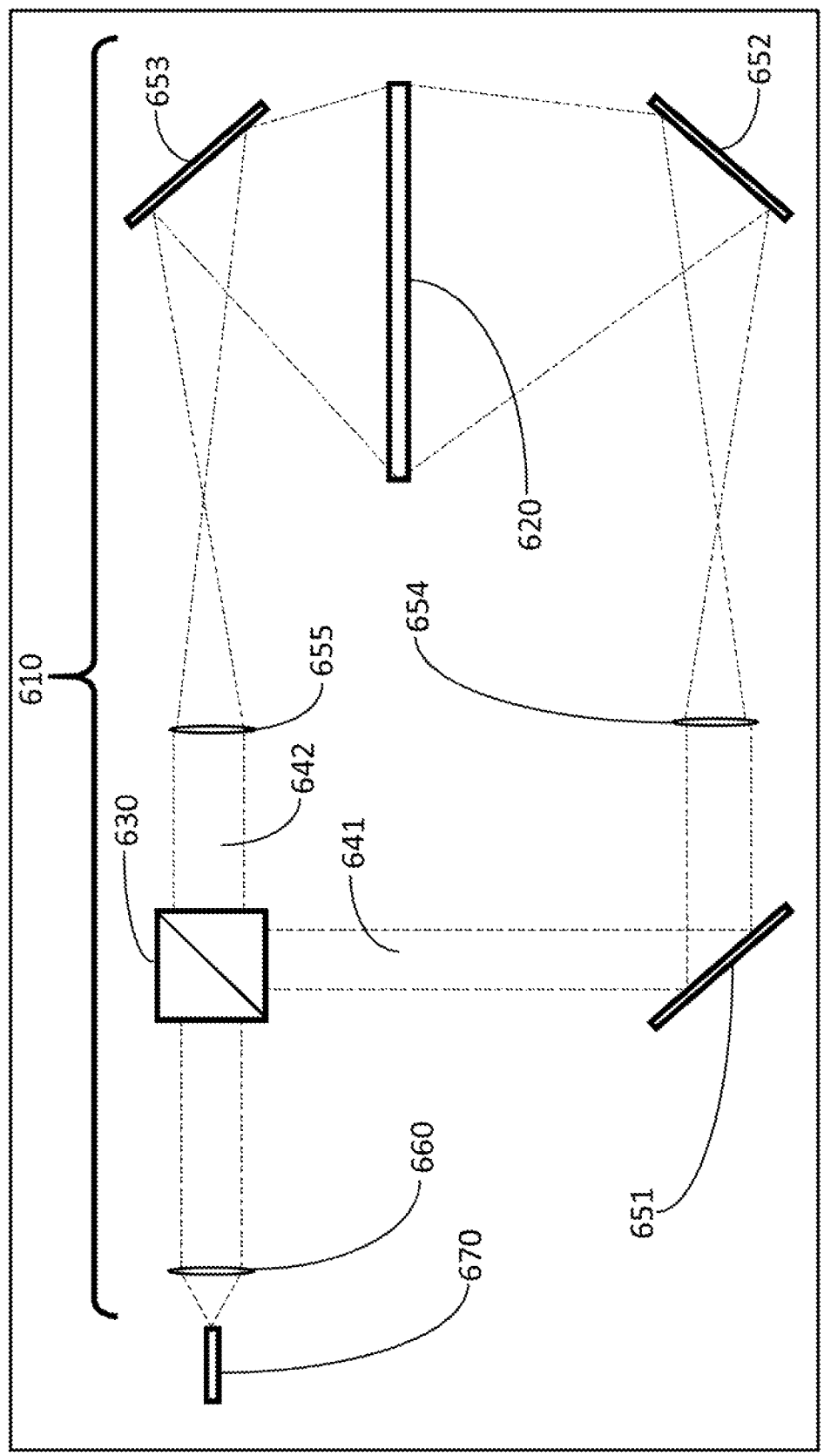
FIG. 6 is a top-elevational view of aperture-free hologram recording assembly 600 in accordance with the present systems, devices, and methods.

FIG. 6 is a top-elevational view of aperture-free hologram recording assembly 600 in accordance with the present systems, devices, and methods. Aperture-free hologram recording assembly 600 comprises: aperture-free optical path 610, HRM 620, beamsplitter 630, object beam 641, reference beam 642, object beam mirror 651, object beam mirror 652, reference beam mirror 653, object beam lens 654, reference beam lens 655, collimating lens 660 and laser light source 670.

Laser light source 670 generates a beam of laser light. The beam of laser light travels along aperture-free optical path 610. Aperture-free optical path 610 includes HRM 620, beamsplitter 630, object beam mirror 651, object beam mirror 652, reference beam mirror 653, object beam lens 654, reference beam lens 655, and collimating lens 660. Aperture-free optical path 610 does not include laser light source 670. Collimating lens 660 collimates the beam of laser light after the beam of laser light exits laser light source 670. HRM 620 may comprise a layer of holographic material. HRM 620 may comprise a masked layer of holographic material substantively similar to masked layer of holographic material 500.

Beamsplitter 630 splits the beam of laser light to form object beam 641 and reference beam 642. Object beam mirror 651 and object beam mirror 652 route object beam 641 to illuminate HRM 620. Object beam lens 654 shapes object beam 641 to a desired cross-section at HRM 620. Reference beam mirror 653 routes reference beam 642 to illuminate HRM 620. Reference beam lens 655 shapes reference beam 642 to a desired cross-section at HRM 620.

Aperture-free hologram recording assembly 600 may record a hologram in HRM 620 by illuminating HRM 620 with object beam 641 and reference beam 642. HRM 620 may be substantively similar to HRM 300 (FIG. 3). The use of a HRM substantively similar to HRM 300 is advantageous since the recorded hologram will not be significantly larger than recording area 310 (FIG. 3) regardless of the spot size of the object beam or the spot size of the reference beam; a hologram cannot be recorded in bleached area 320 (FIG. 3) and boundary area 330 (FIG. 3) is typically small relative to the size of recording area 310. The insensitivity of HRM to large spot sizes allows for larger tolerances in spot size, reducing the need for careful positioning of object beam lens 654 and reference beam lens 655.

Figure 7:
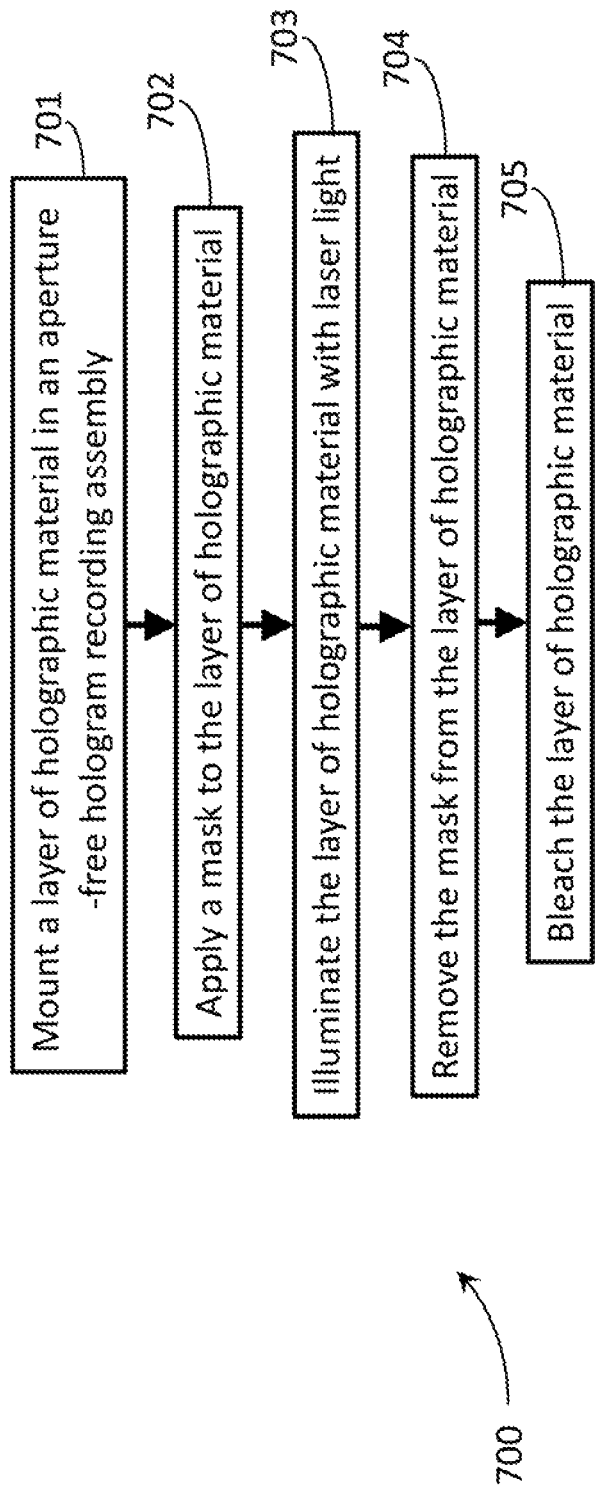
FIG. 7 is a flow-diagram showing a method 700 of recording a hologram in accordance with the present systems, devices, and methods.

FIG. 7 is a flow-diagram showing a method 700 of recording a hologram in accordance with the present systems, devices, and methods. Method 700 includes five acts 701, 702, 703, 704, and 705 though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments.

As an illustrative example of the physical elements of method 700, analogous structures from FIG. 5 and FIG. 6 are called out in parentheses throughout the description of acts 701, 702, 703, 704, and 705.

At 701, a layer of holographic material (510, 620) is mounted in an aperture-free recording assembly (600). The aperture-free hologram recording assembly (600) comprises a laser light source (670) and an aperture-free optical path (610). The laser light source (670) does not require an aperture in order to generate a laser light signal, the beam diameter of the laser light signal generated by the laser light source (670) may be controlled via controlling the geometry of a resonant chamber of the laser light source (670). A person of skill in the art will appreciate that controlling the geometry of the resonant chamber of the laser light source controls where and how photons of light are created rather than blocking light in a manner consistent with an aperture. The laser light source may comprise at least one aperture. The aperture-free optical path (610) may comprise beam-routing mirrors (651, 652, 653), and the aperture-free optical path (610) may comprise beam-shaping lenses (654, 655), however the aperture-free optical path (610) does not comprise any apertures. The aperture-free optical path (610) does not include the laser light source (670).

At 702, a mask (520) is applied to the layer of holographic material (510, 620). The mask (520) comprises at least one obstructive area (532) wherein the at least one obstructive area (532) is configured to shield a portion of the layer of holographic material from light exposure. The mask (520) comprises at least one permissive area (531) wherein the at least one permissive area (531) is configured to expose a portion of the layer of holographic material to light.

The layer of holographic material (510, 620) may comprise a front surface (511) and a back surface (512). Applying a mask (520) to the layer of holographic material (510, 620) may include applying a front mask (521) to the front surface of the layer of holographic material (511). The front mask comprises at least one permissive area (531) and at least one obstructive area (532). Applying a mask (520) to the layer of holographic material (510, 620) may include applying a back mask (522) to the back surface of the layer of holographic material (512). The back mask comprises at least one permissive area (531) and at least one obstructive area (532). Each permissive area (531) of the back mask (522) is aligned with a respective permissive area (521) of the front mask (521) along the principal axis of the layer of holographic material. Each obstructive area (532) of the back mask (522) is aligned with a respective obstructive area (532) of the front mask along the principal axis of the layer of holographic material.

The front mask (521) may comprise at least one permissive area with a shape selected from a group consisting of: a circle, an oval, a triangle, a square, a rectangle, a hexagon, and an octagon. The back mask (522) may comprise at least one permissive area with a shape selected from a group consisting of: a circle, an oval, a triangle, a square, a rectangle, a hexagon, and an octagon.

At 703, the layer of holographic material (510, 620) is illuminated with laser light. The layer of holographic material (510, 620) may comprise a masked layer of holographic material (500). Illuminating the layer of holographic material (510, 620) with laser light includes routing laser light from a laser light source (670) along an aperture-free optical path (610) to the layer of holographic material (510, 620). Illuminating the layer of holographic material (510, 620) with laser light may include illuminating the layer of holographic material (510, 620) with laser light generated by a laser light source (670) wherein the laser light source (670) comprises an aperture. An aperture within the laser light source (670) may create an undesirable diffraction pattern, however the distance between the laser light source (670) and the layer of holographic material (510, 620) may be large enough to ensure that the undesirable diffraction pattern falls on a portion of the layer of holographic material that is covered by the obstructive area (532) of the mask (520) covering the layer of holographic material (510, 620).

Illuminating the layer of holographic material (510, 620) with laser light records a hologram in the layer of holographic material (510, 620). If the layer of holographic material (510, 620) comprises a masked layer of holographic material (500), the hologram is not recorded in any area of the layer of holographic material (510, 620) covered by the at least one obstructive area (532) because the obstructive area (532) shields the layer of holographic material (510, 620) from the laser light. If the layer of holographic material (510, 620) comprises a masked layer of holographic material (500), the hologram is recorded in the area of the layer of holographic material (510, 620) covered by the at least one permissive area (531) because the at least one permissive area (531) allows the layer of holographic material (510, 620) to be exposed to the laser light. If the layer of holographic material (510, 620) comprises a masked layer of holographic material (500), the mask (520) limits the size and position of a recorded hologram to the area of the layer of holographic material (510, 620) covered by the at least one permissive area (531) of the mask, therefore the mask (520) eliminates the need for apertures in the aperture-free hologram recording assembly (600).

A person of skill in the art will appreciate that a mask (520) and an aperture both block at least a portion of laser light from reaching the layer of holographic material (510, 620) and simultaneously comprise a sharp edge that diffracts laser light. A mask (520) is placed in direct physical contact with the layer of holographic material (510, 620), therefore any diffraction caused by the mask (520) can only propagate through a distance equal to the thickness of the layer of holographic material (510, 620) and any included protective materials. The thickness of the layer of holographic material (510, 620) is typically less than two millimeters and no significant diffraction can occur with such a short propagation distance. An aperture is typically positioned at a distance of more than ten centimeters from the layer of holographic material (510, 620), since an aperture is designed to allow additional beam manipulation further along the optical path of the beam. Significant diffraction propagation can occur over a distance of more than ten centimeters leading to the recording of unintentional secondary holograms in the layer of holographic material (510, 620).

Routing the laser light from the laser light source along an aperture-free optical path to the layer of holographic material may include splitting the laser light with a beamsplitter to form a laser light object beam and a laser light reference beam. Routing the laser light from the laser light source along an aperture-free optical path to the layer of holographic material may include collimating the laser light object beam, collimating the laser light reference beam, routing the laser light object beam to illuminate the layer of holographic material (500), and routing the laser light reference beam to illuminate the layer of holographic material (500).

Collimating the laser light object beam includes collimating the laser light object beam with a collimating lens. Collimating the laser light reference beam includes collimating the laser light reference beam with a collimating lens. Routing the laser light object beam to illuminate the layer of holographic material (500) includes routing the laser light object beam with an object beam mirror (653). Routing the laser light reference beam to illuminate the layer of holographic material (500) includes routing the laser light reference beam with a reference beam mirror (651, 652)

Illuminating the layer of holographic material (510, 620) with laser light may include illuminating the layer of holographic material (510, 620) with laser light that comprises N wavelengths of laser light, where N is an integer greater than 1. Illuminating the layer of holographic material (510, 620) with laser light comprising N different wavelengths of laser light records a wavelength-multiplexed hologram in the layer of holographic material (510, 620). A wavelength-multiplexed hologram is advantageous because wavelength-multiplexed holograms can produce full-color displays when used in holographic display applications.

Illuminating the layer of holographic material (510, 620) with laser light may include illuminating the layer of holographic material (510, 620) with laser light that comprises N angles, where N is an integer greater than 1. Illuminating the layer of holographic material (510, 620) with laser light comprising N different angles records an angle-multiplexed hologram in the layer of holographic material (510, 620). An angle-multiplexed hologram is advantageous because angle-multiplexed holograms possess an effectively increased angular bandwidth that increases the field of view of displays employing the angle-multiplexed hologram. Illuminating the layer of holographic material (510, 620) with laser light may include concurrently illuminating a same surface of the layer of holographic material (510, 620) with both a laser light reference beam (642) and a laser light object beam (641). Illuminating the layer of holographic material with laser light concurrently with a laser light reference beam (642) and a laser light object beam (641) on a same surface records a transmission hologram in the layer of holographic material (510, 620).

Illuminating the layer of holographic material (510, 620) with laser light may include concurrently illuminating a first surface of the layer of holographic material of the layer of holographic material (510, 620) with a laser light reference beam (642) and a second surface of the layer of holographic material with a laser light object beam (641). The second surface of the layer of holographic material (510, 620) is located opposite the first surface of the layer of holographic material (510, 620). Illuminating the layer of holographic material with laser light concurrently with a laser light reference beam (642) and a laser light object beam (641) on opposite surfaces records a reflection hologram in the layer of holographic material (510, 620).

Illuminating the layer of holographic material (510, 620) with laser light may include illuminating the layer of holographic material with at least one laser light reference beam and at least two laser light object beams. Each of the at least two laser light object beams may illuminate the layer of holographic material (510, 620) with a respective one of θ angles, where θ is an integer greater than 1.

At 704, the mask (520) is removed from the layer of holographic material (510, 620). Removal of the mask (520) allows the areas of the layer of holographic material (510, 620) that were previously covered by the obstructive areas (532) of the mask (520) to subsequently be exposed to light.

At 705, the layer of holographic material (510, 620) is bleached. Bleaching the layer of holographic material (510, 620) may include photobleaching. Photobleaching the layer of holographic material (510, 620) includes exposing the layer of holographic material to light. The light used for photobleaching may be incoherent light. The light used for photobleaching may be polychromatic, wherein at least a portion of the light which is used for photobleaching may be absorbed by the photoinitiator or the monomer. Photobleaching the layer of holographic material (510, 620) converts at least a portion of the layer of holographic material (510, 620) from a photopolymerizable material to a material that is not photopolymerizable.

Method 700 may further comprise pre-bleaching the layer of holographic material (510, 620). Pre-bleaching the layer of holographic material (510, 620) includes converting a portion of the layer of holographic material (510, 620) from a material that is photopolymerizable to a material that is not photopolymerizable. Pre-bleaching the layer of holographic material (510, 620) may include photo-bleaching the layer of holographic material (510, 620).

Pre-bleaching the layer of holographic material (510, 620) occurs subsequent to applying a mask (520) to the layer of holographic material (510, 620). Pre-bleaching the layer of holographic material (510, 620) occurs prior to removing the mask (520) from the layer of holographic material (510, 620). If the layer of holographic material (510, 620) is pre-bleached, applying a mask (520) to the layer of holographic material (510, 620) includes applying a negative mask to the layer of holographic material (510, 620). A negative mask comprises a mask (520) wherein the obstructive areas (532) cover the portion of the layer of holographic material (510, 620) that, subsequent to pre-bleaching, comprises a material that is photopolymerizable. A negative mask comprises a mask (520) wherein the at least one permissive area (531) covers the portion of the layer of holographic material (510, 620) that, subsequent to pre-bleaching, comprises a material that is not photopolymerizable. The maximum size of a hologram that may be recorded in the layer of holographic material (510, 620) is equal to the size of the areas of the layer of holographic material (510, 620) that were covered by the at least one obstructive area (532) of the negative mask. The limits on the size of the recordable hologram imposed by pre-bleaching the layer of holographic material (510, 620) with a negative mask eliminate the need for apertures in the aperture-free hologram recording assembly (600).

Figure 8:
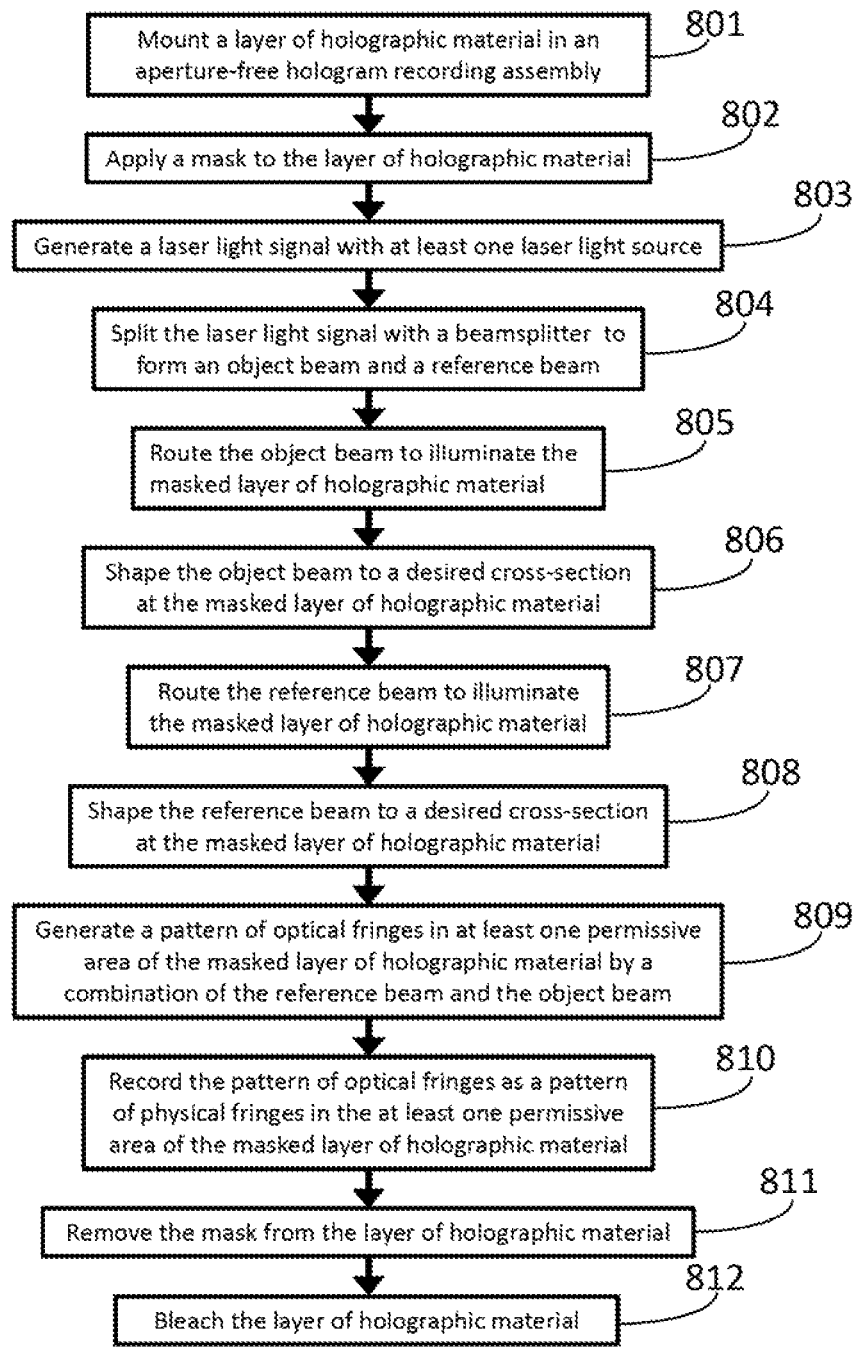
FIG. 8 is a flow-diagram showing a method 800 of recording a hologram in accordance with the present systems, devices, and methods.

FIG. 8 is a flow-diagram showing a method 800 of recording a hologram in accordance with the present systems, devices, and methods. Method 800 includes twelve acts 801, 802, 803, 804, 805, 806, 807, 808, 809, 810, 811, and 812 though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments.

As an illustrative example of the physical elements of method 700, analogous structures from FIG. 5 and FIG. 6 are called out in parentheses throughout the description of acts 801, 802, 803, 804, 805, 806, 807, 808, 809, 810, 811, and 812.

At 801, a layer of holographic material (510, 620) is mounted in an aperture-free recording assembly (600). The aperture-free hologram recording assembly (600) comprises a laser light source (670) and an aperture-free optical path (610). The laser light source (670) does not require an aperture in order to generate a laser light signal, the beam diameter of the laser light signal may be controlled via careful design of a resonant chamber of the laser light source (670). The laser light source may comprise at least one aperture. The aperture-free optical path (610) may comprise beam-routing mirrors (651, 652, 653), and the aperture-free optical path (610) may comprise beam-shaping lenses (654, 655), however the aperture-free optical path (610) does not comprise any apertures. The aperture-free optical path (610) does not include the laser light source (670).

At 802, a mask (520) is applied to the layer of holographic material (510, 620). The mask (520) comprises at least one obstructive area wherein the at least one obstructive area is configured to shield a portion of the layer of holographic material from light exposure. The mask (520) comprises at least one permissive area wherein the at least one permissive area is configured to expose a portion of the layer of holographic material to light. The mask (520) eliminates the need for apertures in the aperture-free hologram recording assembly (600).

The layer of holographic material (510, 620) may comprise a front surface (511) and a back surface (512). Applying a mask (520) to the layer of holographic material (510, 620) may include applying a front mask (521) to the front surface of the layer of holographic material (511). The front mask comprises at least one permissive area (531) and at least one obstructive area (532). Applying a mask (520) to the layer of holographic material (510, 620) may include applying a back mask (522) to the back surface of the layer of holographic material (512). The back mask comprises at least one permissive area (531) and at least one obstructive area (532). Each permissive area (531) of the back mask (522) is aligned with a respective permissive area (521) of the front mask (521) along the principal axis of the layer of holographic material. Each obstructive area (532) of the back mask (522) is aligned with a respective obstructive area (532) of the front mask along the principal axis of the layer of holographic material.

The front mask (521) may comprise at least one permissive area with a shape selected from a group consisting of: a circle, an oval, a triangle, a square, a rectangle, a hexagon, and an octagon. The back mask (522) may comprise at least one permissive area with a shape selected from a group consisting of: a circle, an oval, a triangle, a square, a rectangle, a hexagon, and an octagon.

At 803, a laser light signal is generated with at least one laser light source (670). Generating a laser light signal may include generating a laser light signal comprising N wavelengths of laser light, where N is an integer greater than 1. Generating a laser light signal may include generating a laser light signal with a laser light source (670), wherein the laser light source (670) comprises an aperture.

At 804, the laser light signal is split with a beamsplitter (630) to form an object beam (641) and a reference beam (642). Non-exclusive examples of beamsplitters include a beamsplitter cube, a Wollaston prism, and a semi-silvered mirror.

At 805, the object beam (641) is routed to illuminate the layer of holographic material (500). Non-exclusive examples of object beam routing components include a mirror (651, 652), a prism, split wedges, and an optical fiber. Routing the object beam to illuminate the layer of holographic material (510, 620) may include routing the object beam to illuminate a first surface of the layer of holographic material (510, 620).

At 806, the object beam (641) is shaped to a desired cross-section at the layer of holographic material (500). Non-exclusive examples of object beam shaping components include a lens (654) and a diffractive optical element.

At 807, the reference beam (642) is routed to illuminate the layer of holographic material (500). Non-exclusive examples of reference beam routing components include a mirror (653), a prism, split wedges, and an optical fiber.

Routing the reference beam to illuminate the layer of holographic material (510, 620) may include routing the reference beam to illuminate a first surface of the layer of holographic material (510, 620). Routing the object beam and the reference beam to the same surface of the layer of holographic material (510, 620) allows recording of a transmission hologram. Routing the reference beam to illuminate the layer of holographic material (510, 620) may include routing the reference beam to illuminate a second surface of the layer of holographic material (510, 620). The second surface of the layer of holographic material (510, 620) is opposite the first surface of the layer of holographic material (510, 620). Routing the object beam and the reference beam to opposite surfaces of the layer of holographic material (510, 620) allows recording of a reflection hologram.

At 808, the reference beam (642) is shaped to a desired cross-section at the layer of holographic material (500). Non-exclusive examples of reference beam shaping components include a lens (655) and a diffractive optical element.

At 809, a pattern of optical fringes is generated in at least at least a portion of the layer of holographic material (510, 620) by a combination of the reference beam and the object beam. The layer of holographic material (510, 620) may comprise a masked layer of holographic material (500). If the layer of holographic material (510, 620) comprises a masked layer of holographic material (500), the pattern of optical fringes is generated only in the portion of the layer of holographic material (510, 620) covered by the at least one permissive area (531) of the mask.

Generating a pattern of optical fringes in at least a portion of the layer of holographic material (510, 620) by a combination of the reference beam and the object beam may include generating N sub-patterns of optical fringes in at least a portion of the layer of holographic material by the combination of the reference beam and the object beam, where N is an integer greater than 1.

At 810, the pattern of optical fringes is recorded as a pattern of physical fringes in at least a portion of the layer of holographic material (510, 620).

If the layer of holographic material (510, 620) comprises a masked layer of holographic material (500), the pattern of optical fringes is recorded as a pattern of physical fringes only in the portion of the layer of holographic material (510, 620) covered by the at least one permissive area (531) of the mask.

Recording a pattern of optical fringes as a pattern of physical fringes in at least a portion of the layer of holographic material (510, 620) may include recording N sub-patterns of optical fringes as N sub-patterns of physical fringes in at least a portion of the layer of holographic material, where N is an integer greater than 1.

At 811, the mask (520) is removed from the layer of holographic material (510, 620).

At 812, the layer of holographic material is bleached. Bleaching the layer of holographic material (510, 620) may include photobleaching. Method 800 may further comprise pre-bleaching the layer of holographic material (510, 620). Pre-bleaching the layer of holographic material (510, 620) may include photo-bleaching the layer of holographic material (510, 620).

Pre-bleaching the layer of holographic material (510, 620) occurs prior to removing the mask (520) from the layer of holographic material (510, 620). If the layer of holographic material (510, 620) is pre-bleached, applying a mask (520) to the layer of holographic material (510, 620) includes applying a negative mask to the layer of holographic material (510, 620). A negative mask comprises a mask (520) wherein the obstructive areas (532) cover the portion of the layer of holographic material that will contain a recorded hologram. A negative mask comprises a mask (520) wherein the at least one permissive area (531) covers the portion of the layer of holographic material that will not contain a recorded hologram. Pre-bleaching the layer of holographic material (510, 620) covered by a negative mask eliminates the need for apertures in the aperture-free hologram recording assembly (600).

Generating a laser light signal may include generating a laser light signal comprising M angles, where M is an integer greater than 1. Generating a pattern of optical fringes in at least a portion of the layer of holographic material by a combination of the reference beam and the object beam may include generating M sub-patterns of optical fringes in at least a portion of the layer of holographic material by the combination of the reference beam and the object beam. Recording the pattern of optical fringes as a pattern of physical fringes in at least a portion of the layer of holographic material may include recording the M sub-patterns of optical fringes as M sub-patterns of physical fringes in at least a portion of the layer of holographic material. Recording the M sub-patterns of optical fringes as M sub-patterns of physical fringes records an angle-multiplexed hologram in the layer of holographic material (510, 620).

Figure 9:
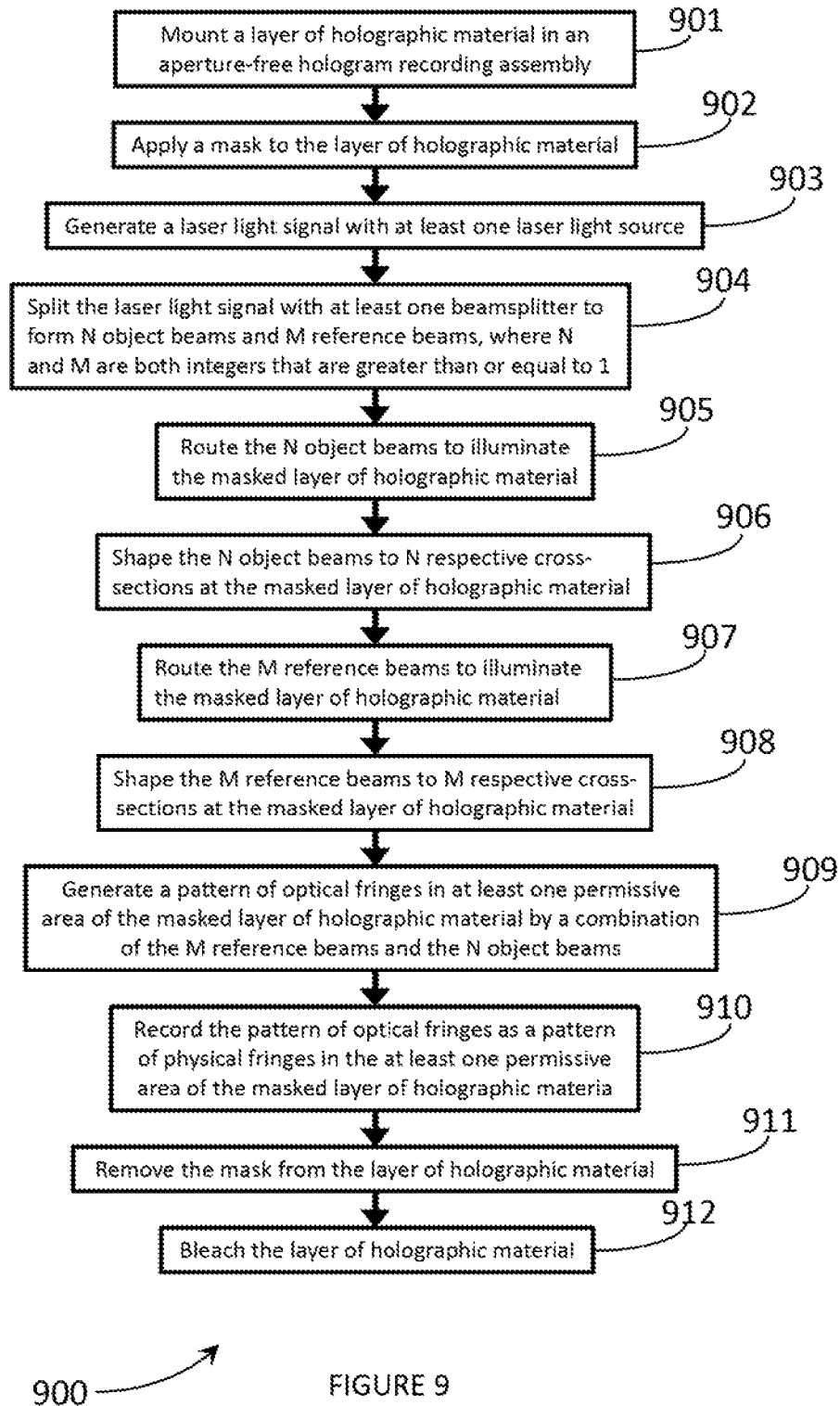
FIG. 9 is a flow-diagram showing a method 900 of recording a hologram in accordance with the present systems, devices, and methods.

FIG. 9 is a flow-diagram showing a method 900 of recording a hologram in accordance with the present systems, devices, and methods. Method 900 includes twelve acts 901, 902, 903, 904, 905, 906, 907, 908, 909, 910, 911, and 912 though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments.

As an illustrative example of the physical elements of method 900, analogous structures from FIG. 5 and FIG. 6 are called out in parentheses throughout the description of acts 901, 902, 903, 904, 905, 906, 907, 908, 909, 910, 911, and 912.

At 901, a layer of holographic material (510, 620) is mounted in an aperture-free recording assembly (600). The aperture-free hologram recording assembly (600) comprises a laser light source (670) and an aperture-free optical path (610). The laser light source (670) does not require an aperture in order to generate a laser light signal, the beam diameter of the laser light signal may be controlled via careful design of a resonant chamber of the laser light source (670). The laser light source may comprise at least one aperture. The aperture-free optical path (610) may comprise beam-routing mirrors (651, 652, 653), and the aperture-free optical path (610) may comprise beam-shaping lenses (654, 655), however the aperture-free optical path (610) does not comprise any apertures. The aperture-free optical path (610) does not include the laser light source (670).

At 902, a mask (520) is applied to the layer of holographic material (510, 620). The mask (520) comprises at least one obstructive area wherein the at least one obstructive area is configured to shield a portion of the layer of holographic material from light exposure. The mask (520) comprises at least one permissive area wherein the at least one permissive area is configured to expose a portion of the layer of holographic material to light. The mask (520) eliminates the need for apertures in the aperture-free hologram recording assembly (600).

At 903, a laser light signal is generated with at least one laser light source (670). Generating a laser light signal may include generating a laser light signal with a laser light source (670), wherein the laser light source (670) comprises an aperture.

At 904, the laser light signal is split with at least one beamsplitter (630) to form N object beams (641) and M reference beams (642), where N and M are both integers that are greater than or equal to 1. Non-exclusive examples of beamsplitters include a beamsplitter cube, a Wollaston prism, and a semi-silvered mirror.

At 905, the N object beams (641) are routed to illuminate the layer of holographic material (510, 620). Non-exclusive examples of object beam routing components include a mirror (651, 652), a prism, split wedges, and an optical fiber. Routing the N object beams to illuminate the layer of holographic material (510, 620) may include routing the object beam to illuminate a first surface of the layer of holographic material (510, 620).

At 906, the N object beams (641) are shaped to N respective cross-sections at the layer of holographic material (510, 620). Non-exclusive examples of object beam shaping components include a lens (654) and a diffractive optical element.

At 907, the M reference beams (642) are routed to illuminate the layer of holographic material (500). Non-exclusive examples of reference beam routing components include a mirror (653), a prism, split wedges, and an optical fiber.

Routing the M reference beams (642) to illuminate the layer of holographic material (510, 620) may include routing the M reference beams (642) to illuminate a first surface of the layer of holographic material (510, 620). Routing the N object beams and the M reference beams to the same surface of the layer of holographic material (510, 620) allows recording of a transmission hologram. Routing the M reference beams to illuminate the layer of holographic material (510, 620) may include routing the M reference beams to illuminate a second surface of the layer of holographic material (510, 620). The second surface of the layer of holographic material (510, 620) is opposite the first surface of the layer of holographic material (510, 620). Routing the N object beams and the M reference beams to opposite surfaces of the layer of holographic material (510, 620) allows recording of a reflection hologram.

At 908, the M reference beams (642) are shaped to M respective cross-sections at the layer of holographic material (510, 620). Non-exclusive examples of reference beam shaping components include a lens (655) and a diffractive optical element.

At 909, a pattern of optical fringes is generated in at least a portion of the layer of holographic material (510, 620) by a combination of the M reference beams and the N object beams. The layer of holographic material (510, 620) may comprise a masked layer of holographic material (500). If the layer of holographic material (510, 620) comprises a masked layer of holographic material (500), the pattern of optical fringes is generated only in the portion of the layer of holographic material (510, 620) covered by the at least one permissive area (531) of the mask.

At 910, the pattern of optical fringes is recorded as a pattern of physical fringes in at least a portion of the layer of holographic material (500). If the layer of holographic material (510, 620) comprises a masked layer of holographic material (500), the pattern of optical fringes is recorded as a pattern of physical fringes only in the portion of the layer of holographic material (510, 620) covered by the at least one permissive area (531) of the mask.

Generating a pattern of optical fringes in at least a portion of the layer of holographic material (510, 620) by a combination of the reference beam and the object beam may include generating L sub-patterns of optical fringes in at least a portion of the layer of holographic material by the combination of the reference beam and the object beam, where L is an integer greater than 1.

At 911, the mask is removed from the layer of holographic material (510, 620).

At 912, the layer of holographic material is bleached. Bleaching the layer of holographic material (510, 620) may include photobleaching. Method 900 may further comprise pre-bleaching the layer of holographic material (510, 620). Pre-bleaching the layer of holographic material (510, 620) may include photo-bleaching the layer of holographic material (510, 620).

Pre-bleaching the layer of holographic material (510, 620) occurs prior to removing the mask (520) from the layer of holographic material (510, 620). If the layer of holographic material (510, 620) is pre-bleached, applying a mask (520) to the layer of holographic material (510, 620) includes applying a negative mask to the layer of holographic material (510, 620). A negative mask comprises a mask (520) wherein the obstructive areas (532) cover the portion of the layer of holographic material that will contain a recorded hologram. A negative mask comprises a mask (520) wherein the at least one permissive area (531) covers the portion of the layer of holographic material that will not contain a recorded hologram. Pre-bleaching the layer of holographic material (510, 620) covered by a negative mask eliminates the need for apertures in the aperture-free hologram recording assembly (600).

Generating a laser light signal may include generating a laser light signal comprising L wavelengths of laser light, where L is an integer greater than 1. Generating a pattern of optical fringes in at least a portion of the layer of holographic material by a combination of the reference beam and the object beam may include generating L sub-patterns of optical fringes in at least a portion of the layer of holographic material by the combination of the reference beam and the object beam. Recording the pattern of optical fringes as a pattern of physical fringes in at least a portion of the layer of holographic material may include recording the L sub-patterns of optical fringes as L sub-patterns of physical fringes in at least a portion of the layer of holographic material. Recording the L sub-patterns of optical fringes as N sub-patterns of physical fringes records an angle-multiplexed hologram in the layer of holographic material (510, 620).

Figure 10:
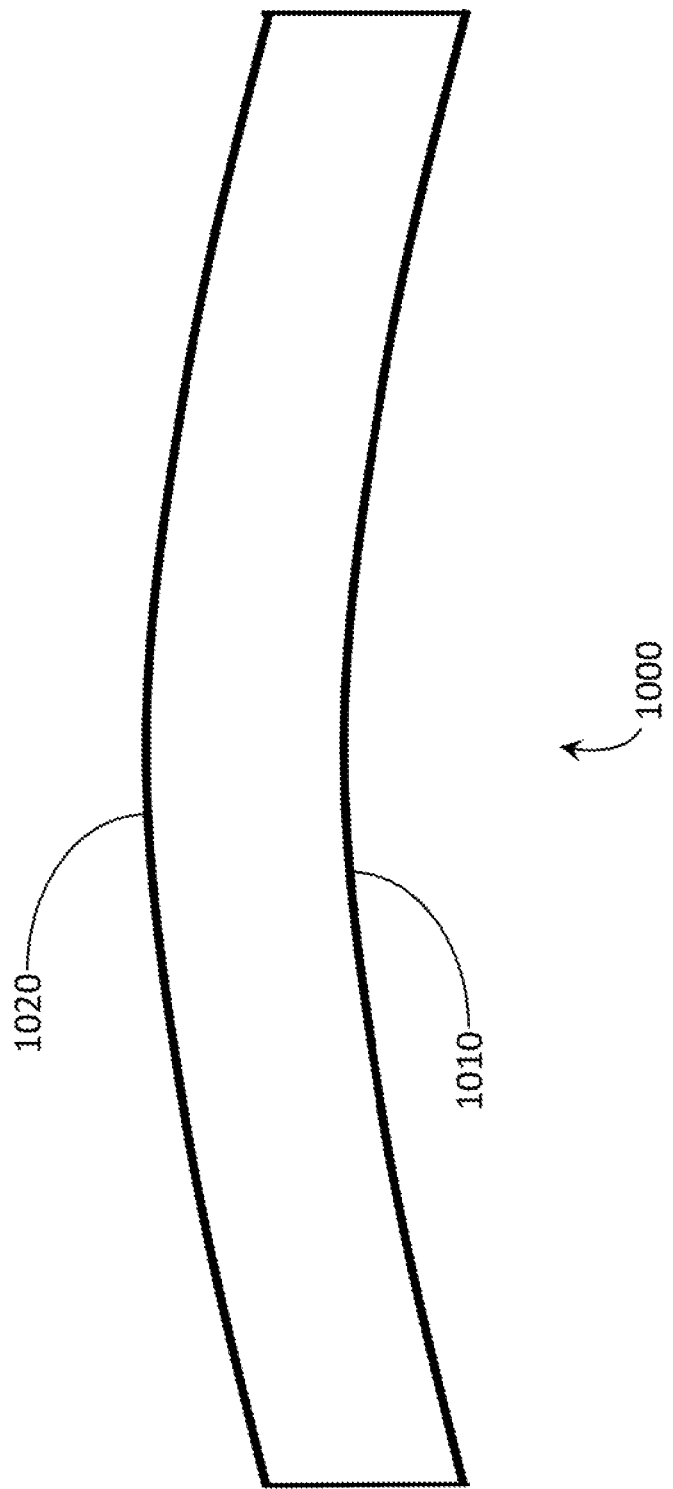
FIG. 10 is a top elevational view of curved HOE 1000 in accordance with the present systems, devices, and methods.

FIG. 10 is a top elevational view of curved HOE 1000 in accordance with the present systems, devices, and methods. Curved HOE 1000 comprises a single contiguous layer of photopolymer material. Curved HOE 1000 may be substantively similar to HOE 200. Curved HOE comprises eye-side surface 1010 and world-side surface 1020. Curved HOE 1000 is cylindrically curved around an axis of curvature, the axis of curvature of HOE 200 is located on the eye-side of curved HOE 1000 at a distance of between 1 and 10 centimeters, between 10 and 50 cm, or between 50 and 100 cm from eye-side surface 1010.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to: US Patent Application Publication No. US 2017-0068095 A1, US Patent Application Publication No. US 2017-0212290 A1, U.S. Provisional Patent Application Ser. No. 62/487,303, U.S. Provisional Patent Application Ser. No. 62/534,099, U.S. Provisional Patent Application Ser. No. 62/565,677, U.S. Provisional Patent Application Ser. No. 62/482,062, and U.S. Provisional Patent Application Ser. No. 62/593,073 are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of recording a hologram, the method comprising:
   mounting a layer of holographic material in an aperture-free hologram recording assembly;
   applying a mask to the layer of holographic material, the mask comprising:
      at least one obstructive area wherein the at least one obstructive area is configured to shield a first portion of the layer of holographic material from light exposure; and
      at least one permissive area wherein the at least one permissive area is configured to expose a second portion of the layer of holographic material to light;
   illuminating the layer of holographic material with laser light, wherein illuminating the layer of holographic material with laser light includes routing laser light from a laser light source along an aperture-free optical path to the layer of holographic material;
   removing the mask from the holographic material; and
   bleaching the holographic material.

2. The method of claim 1 wherein routing the laser light from the laser light source along an aperture-free optical path to the layer of holographic material includes:
   splitting the laser light with a beamsplitter to form an object beam and a reference beam;
   collimating the object beam;
   routing the object beam to illuminate the layer of holographic material; collimating the reference beam; and
   routing the reference beam to illuminate the layer of holographic material.

3. The method of claim 1 wherein the layer of holographic material comprises a front surface and a back surface, and wherein applying a mask to the layer of holographic material includes:
   applying a front mask to the front surface of the layer of holographic material, wherein the front mask comprises at least one permissive area and at least one obstructive area; and
   applying a back mask to the back surface of the layer of holographic material, wherein the back mask comprises at least one permissive area and at least one obstructive area, and wherein the back mask is positioned and oriented such that:
      each permissive area of the back mask is aligned with a respective permissive area of the front mask along a principal axis of the layer of holographic material; and
      each obstructive area of the back mask is aligned with a respective obstructive area of the front mask along the principal axis of the layer of holographic material.

4. The method of claim 3 wherein applying a front mask to the front surface of the layer of holographic material includes applying a front mask to the front surface of the layer of holographic material wherein the front mask comprises at least one permissive area with a shape selected from a group consisting of: a circle, an oval, a triangle, a square, a rectangle, a hexagon, and an octagon; and
   wherein applying a back mask to the back surface of the layer of holographic material includes applying a back mask to the back surface of the layer of holographic material wherein the back mask comprises at least one permissive area with a shape chosen from a group consisting of: a circle, an oval, a triangle, a square, a rectangle, a hexagon, and an octagon.

5. The method of claim 1, further comprising:
   pre-bleaching the layer of holographic material subsequent to applying a mask to the layer of holographic material, wherein applying a mask to the layer of holographic material includes applying a negative mask to the layer of holographic material.

6. The method of claim 1 wherein illuminating the layer of holographic material with laser light includes illuminating the layer of holographic material with laser light that comprises N different wavelengths of laser light, where N is an integer greater than 1.

7. The method of claim 1 wherein illuminating the layer of holographic material with laser light includes concurrently illuminating a same surface of the layer of holographic material with both a laser light reference beam and a laser light object beam.

8. The method of claim 1 wherein illuminating the layer of holographic material with laser light includes concurrently illuminating a first surface of the layer of holographic material with a laser light reference beam and a second surface of the layer of holographic material with a laser light object beam, wherein the second surface of the layer of holographic material is located opposite the first surface of the layer of holographic material.

9. The method of claim 1 wherein illuminating the layer of holographic material with laser light includes illuminating the layer of holographic material with at least one laser light reference beam and at least two laser light object beams.

10. The method of claim 1 wherein illuminating the layer of holographic material with laser light includes illuminating the layer of holographic material with laser light generated by a laser light source wherein the laser light source comprises an aperture.

11. The method of claim 1 wherein illuminating the layer of holographic material with laser light includes illuminating the layer of holographic material with laser light that comprises N different angles, where N is an integer greater than 1.

12. A method of fabricating a holographic recording medium ("HRM"), the method comprising:
- applying a mask to a layer of holographic material, the mask comprising:
  - at least one obstructive area wherein the at least one obstructive area is configured to shield a first portion of the layer of holographic material from light exposure; and
  - at least one permissive area wherein the at least one permissive area is configured to expose a second portion of the layer of holographic material to light;
- removing the mask from the layer of holographic material; and
- bleaching the masked layer of holographic material, wherein bleaching the masked layer of holographic material includes exposing the at least one permissive area of the mask to light.

13. The method of claim 12 wherein the layer of holographic material comprises a front surface and a back surface, and wherein applying a mask to the layer of holographic material includes:
- applying a front mask to the front surface of the layer of holographic material, wherein the front mask comprises at least one permissive area and at least one obstructive area; and
- applying a back mask to the back surface of the layer of holographic material, wherein the back mask comprises a single obstructive area.

14. The method of claim 12 wherein applying a mask to a layer of holographic material includes applying a mask to a layer of holographic material wherein the mask includes at least one obstructive area with a shape selected from a group consisting of: a circle, an oval, a triangle, a square, a rectangle, a hexagon, and an octagon.

* * * * *